United States Patent
Flynn et al.

(10) Patent No.: US 10,964,068 B2
(45) Date of Patent: Mar. 30, 2021

(54) METHODS AND DEVICES FOR PREDICTIVE POINT CLOUD ATTRIBUTE CODING

(71) Applicants: BlackBerry Limited, Waterloo (CA); 2236008 Ontario Inc., Waterloo (CA)

(72) Inventors: David Flynn, Darmstadt (DE); Sébastien Lasserre, Thorigné-Fouillard (FR)

(73) Assignee: BlackBerry Limited, Waterloo (CA)

( * ) Notice: Subject to any disclaimer, the term of this patent is extended or adjusted under 35 U.S.C. 154(b) by 198 days.

(21) Appl. No.: 16/356,098

(22) Filed: Mar. 18, 2019

(65) Prior Publication Data

US 2020/0302651 A1    Sep. 24, 2020

(51) Int. Cl.
  *G06T 9/20* (2006.01)
  *G06T 3/40* (2006.01)
  *G06T 9/40* (2006.01)

(52) U.S. Cl.
  CPC .............. *G06T 9/20* (2013.01); *G06T 3/4084* (2013.01); *G06T 9/40* (2013.01)

(58) Field of Classification Search
  CPC ........... G06T 9/20; G06T 3/4084; G06T 9/40; H04N 19/96
  USPC ........................................................ 382/232
  See application file for complete search history.

(56) References Cited

U.S. PATENT DOCUMENTS

2017/0347100 A1* 11/2017 Chou .................. H03M 7/3066
2017/0347122 A1* 11/2017 Chou ..................... H04N 19/36
2019/0080483 A1* 3/2019 Mammou ................. G06T 7/50
2019/0081638 A1* 3/2019 Mammou ........... H03M 7/6035
2019/0108639 A1* 4/2019 Tchapmi ................ G06N 5/04
2020/0105025 A1* 4/2020 Yea ........................ H04N 19/19
2020/0107048 A1* 4/2020 Yea ...................... H04N 19/154
2020/0175725 A1* 6/2020 Mekuria ................ G06T 15/08

OTHER PUBLICATIONS

Lassere et al.: "[G-PCC] [new proposal] on an improvement of RAHT to explooit attribute correlation", 126. MPEG Meeting; Mar. 25, 2019-Mar. 29, 2019, Geneva; Motion Picture Expert Group or ISO/IEC JTC1/SC29 (WGII); No. m47378, XP030211360 Mar. 20, 2019.

(Continued)

*Primary Examiner* — Ali Bayat
(74) *Attorney, Agent, or Firm* — Rowand LLP

(57) ABSTRACT

Methods and devices for attribute coding for point clouds. In a top-down coding process a predicted geometry-weighted sum of attributes is determined for each occupied sub-volume of a volume based on a prediction operation that uses at least a geometry-weighted sum of attributes for the volume. The prediction operation involves up-sampling data from the preceding (parent) depth of the coding tree. The predicted geometry-weighted sums of attributes and corresponding original geometry-weighted sums of attributes are subtracted, in the attribute domain or in a transform domain to result in residual coefficients. The AC residual coefficients are coded in the bitstream. The transform used has a DC coefficient property, whereby the DC coefficient from transform of the geometry-weighted sums of attributes for the set of child sub-volumes is the geometry-weighted sum of attributes for the volume.

30 Claims, 16 Drawing Sheets depth *d* depth *d*+1

(56) References Cited

OTHER PUBLICATIONS

Mammou et al.: "G-PCC codec description", 124. MPEG Meeting; Oct. 8, 2018-Oct. 12, 2018 Macao; (Motion Picture Expert Group or ISO/IEC JTCI/SC29/WG11, No. n18015, XP030197734 Oct. 30, 2018.
De Queiroz et al.: "Compression of 3D Point Clouds Using a Region-Adaptive Hierarchical Transform", IEEE Transactions on Image Processing, IEEE Service Centre, Piscataway, NJ, US, vol. 25, No. 8, pp. 3947-3956, XPO11615540 Aug. 1, 2016.
WIPO: "International Search Report and Written Opinion" relating to application No. PCT/EP2020/056734, dated Jun. 17, 2020.

* cited by examiner

METHODS AND DEVICES FOR PREDICTIVE POINT CLOUD ATTRIBUTE CODING

FIELD

The present application generally relates to data compression and, in one particular example, to methods and devices for coding of point clouds. The present application describes methods and devices for coding point cloud attributes using predictive coding.

BACKGROUND

Data compression is used in communications and computer networking to store, transmit, and reproduce information efficiently. Three-dimensional representations of physical space are often stored as point clouds, where the point cloud is made up of a plurality of points each having a geometric location in a given space. There are a range of applications for point clouds. In one example, they may be for virtual reality (VR) or augmented reality (AR) applications. In another example, point clouds may be for computer vision applications, such as automated vehicles.

Point cloud data can be very large, particularly when it is time variant. For example, LiDAR scans may produce a large volume of sparse point cloud data that must be processed, analyzed, or transmitted very quickly for real-time vehicular control applications. As another example, a detailed VR application may involve dense point cloud data with rapid real-time user movement. Accordingly, the efficient compression of point cloud data is a challenge.

Much work has gone into mechanisms for efficiently coding the geometric structure of point clouds. This typically involves the recursive splitting of the geometric space into smaller and smaller sub-units until each occupied sub-unit contains only one of the points. Octree-based coding processes for efficiently coding this positional or geometric data have been developed.

In addition to coding geometry, one or more attributes regarding the points may be coded. For example, in the case of VR, colour or intensity (luma) information may be coded for each pixel. In the case of LiDAR scans, reflectance information may be coded for each pixel. Pixels may have alternative or additional attributes.

It would be advantageous to provide for methods and devices that efficiently and/or effectively compress attribute data for point clouds.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
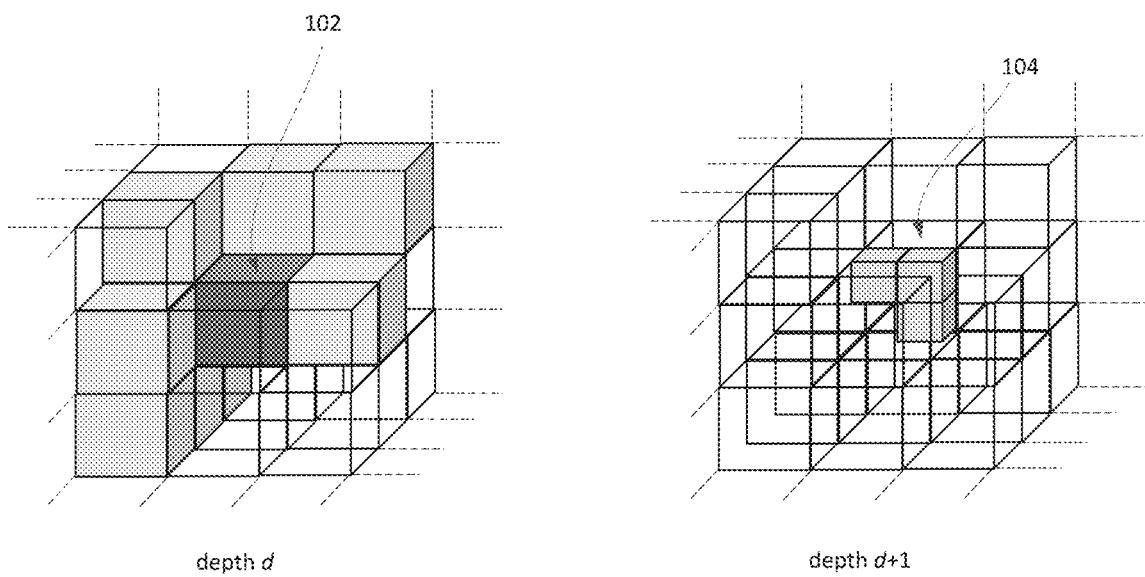
FIG. 1 shows an example of an octree-based point cloud geometry.

The present application describes methods and devices for coding of attributes for a point cloud. The coding may be top-down coding. The methods and devices may involve prediction operations that are based on up-sampling of attribute data from a parent depth in the coding tree. The methods and devices may employ transforms that conform to a DC coefficient property whereby the DC coefficient for transform of a set of geometry-weighted sums of attributes for child sub-volumes is the geometry-weighted sum of attributes for the parent volume.

In one aspect, the present application describes a method of encoding a point cloud to generate a bitstream of compressed point cloud data, the point cloud being located within a space recursively split and containing the points of the point cloud, each point having a respective attribute. The method may include, in a top-down coding process with respect to the recursively split space, for a volume containing sub-volumes that contain a plurality of points, determining a predicted geometry-weighted sum of attributes for each occupied sub-volume of the volume based on a prediction operation based on at least a geometry-weighted sum of attributes for the volume. The method may further include applying a transform to the predicted geometry-weighted sums of attributes to produce predicted coefficients and applying the transform to corresponding original geometry-weighted sums of attributes for the occupied sub-volumes to produce original coefficients; determining a plurality of AC coefficients from the difference between the original coefficients and the predicted coefficients, wherein residual coefficients include one DC coefficient and the plurality of AC coefficients; and encoding the plurality of AC coefficients to output the bitstream of compressed point cloud data.

In another aspect, the present application describes a method of decoding a bitstream of encoded point cloud attributes, the point cloud being located within a space recursively split and containing the points of the point cloud, each point having a respective attribute. The method may include, in a top-down coding process with respect to the recursively split space, for a volume containing sub-volumes that contain a plurality of points, determining a predicted geometry-weighted sum of attributes for each occupied sub-volume of the volume based on a prediction operation based on at least a geometry-weighted sum of attributes for the volume. The method may further include applying a transform to the predicted geometry-weighted sums of attributes to produce predicted AC coefficients; decoding the bitstream to reconstruct residual AC coefficients; setting a DC coefficient to the geometry-weighted sum of attributes for the volume; adding the residual AC coefficients and the DC coefficient to the predicted AC coefficients to produce reconstructed coefficients; and inverse transforming the reconstructed coefficients to produce reconstructed geometry-weighted sums of attributes for the occupied sub-volumes. At a maximum depth the reconstructed geometry-weighted sums of attributes for the occupied sub-volumes are reconstructed attributes.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

In yet another aspect, the present application describes a computer-readable signal containing program instructions which, when executed by a computer, cause the computer to perform the described methods of encoding and/or decoding.

The present application further describes computer-implemented applications, including topography applications, cartography applications, automotive industry applications, autonomous driving applications, virtual reality applications, and cultural heritage applications, etc. These computer-implemented applications include processes of receiving a data stream or data file, unpacking the data stream or data file to obtain a bitstream of compressed point cloud data, and decoding the bitstream as described in the above aspects and its implementations. Thereby, these computer-implemented applications make use of a point cloud compression technique according to aspects and their implementations described throughout the present application.

The present application further describes methods of encoding and decoding point clouds, and encoders and decoders for encoding and decoding point clouds. In some implementations, a receiving unit receives multiplexed data which is obtained by multiplexing coded point cloud data with other coded data types such as metadata, image, video, audio and/or graphics. The receiving unit comprises a de-multiplexing unit to separate the multiplexed data into coded point data and other coded data, and at least one decoding unit (or decoder) to decode the coded point cloud data. In some other implementations, an emitting unit emits multiplexed data which is obtained by multiplexing coded point cloud data with other coded data types such as metadata, image, video, audio and/or graphics. The emitting unit comprises at least one encoding unit (or encoder) to encode the point cloud data, and a multiplexing unit to combine coded point cloud data and other coded data into the multiplexed data.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

At times in the description below, the terms "node", "volume" and "sub-volume" may be used interchangeably. It will be appreciated that a node is associated with a volume or sub-volume. The node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Many of the examples below will refer to the compression of point cloud data. Point clouds provide a suitable example for illustrating the advantages of the present application, as the data in a point cloud is large and predictive operations can be used to improve compression. However, it will be appreciated that point clouds are an example and that the present application provides methods and devices that may be applied to compressing other types of data for other purposes.

A point cloud is a set of points in a three-dimensional coordinate system. The points are often intended to represent the surface of one or more objects. Each point has a location (position) in the three-dimensional coordinate system. The position may be represented by three coordinates (X, Y, Z), which can be Cartesian or any other coordinate system. The terms "position", "location", or "geometry" may be used interchangeably herein to refer to the location of a point in space.

The points may have other associated attributes, such as colour, which may also be a three-component value in some cases, such as R, G, B or Y, Cb, Cr. Other associated attributes may include transparency, reflectance, a normal vector, a time stamp, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured, highly dynamic point clouds obtained through LiDAR (or similar) sensors with a high frequency of capture. The objective of such point clouds is not for human consumption or viewing but rather for machine object detection/classification in a decision process. Attributes may also result from a detection/classification algorithm that segments the point cloud into detected/classified objects; in such case the attribute values are typically the label of the object to which points belong. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

A commonly-used tree structure is an octree. In this structure, the volumes/sub-volumes are all cubes and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. Both these examples relate to cubes or rectangular cuboids; however, the present application is not restricted to such tree structures and the volumes and sub-volumes may have other shapes in some applications. The partitioning of a volume is not necessarily into two sub-volumes (KD-tree) or eight sub-volumes (octree), but could involve other partitions, including division into non-rectangular shapes or involving non-adjacent sub-volumes.

The present application may refer to octrees for ease of explanation and because they are a popular candidate tree structure for automotive applications, but it will be understood that the methods and devices described herein may be implemented using other tree structures.

In the description herein, reference may be made to "levels" or "depth" of the point cloud or its tree-representation. In a tree-based recursive splitting of sub-volumes, it will be appreciated that each successive split adds a further level or depth to the tree, which may go down to a depth or level at which each occupied sub-volume contains one point of the point cloud. A sub-volume may also be referred to as a "node". By convention in the present application, a root or top node or level is the largest defined volume containing at least part of the point cloud. For example, in some cases, the volume containing point cloud may be partitioned into largest coding units (LCUs), and each LCU may be coded independently. In some cases, the LCU may be a volume containing the entire point cloud. Also by convention in the present application a sub-volume at a depth d (or level) may be subdivided into child sub-volumes at a "greater" depth d+1, such that depth d increases with increased resolution of the tree. In this sense, a "greater" depth or level refers to a higher resolution level of smaller sub-volumes in a top-down construction of the tree with the root node at the top at d=0 or d=1, depending on the convention chosen for the depth index d.

The present application may also refer to "up-sampling" of attribute data, in which attribute data from a level d is used to build a prediction of attribute data at a level d+1—i.e. data is up-sampled to predict data at a greater depth/higher resolution. These conventions of terminology or labeling may be modified in some implementations without affecting the substantive operation of the methods and devices described herein.

The geometry of the tree is often coded losslessly. The flags or other bits defining the tree structure may be serialized in some cases. Binary coders or non-binary coders may be used. Predictive operations may be used in some implementations to attempt to further compress the data. Entropy coding may also improve compression. At the decoder, the compressed data is decoded losslessly to reconstruct the geometry of the tree so that the decoder is able to determine the location of each point in the point cloud.

In some cases, geometry may be coded using lossy compression. In that case, the coded octree represents an approximation of the original point cloud, typically requiring fewer bits relative to the lossless coding of the octree representing the original point cloud, but at the price of distortion between the coded geometry and the original geometry. In lossy compression, attributes associated with the reconstructed points of the lossy coded and reconstructed point cloud may be found, during the encoding process, using interpolation from the attributes of original points that are the nearest to the reconstructed point.

The Moving Picture Experts Group (MPEG) and the International Organization for Standardization (ISO) are carrying out ongoing discussions on standards for point cloud compression (PCC). Current work on is reflected, for example, in MPEG-I part 9 regarding Geometry-based Point Cloud Compression. Those ordinarily skilled in the art will be familiar with the options for compression of geometrical point-cloud data.

Point clouds may include more than just geometric location of points. In some cases, the points have attributes, like colour, reflectance, transparency, time stamp, or other characteristics that can be embodied in a value or parameter of some kind. Colour, for example, may be three-component colour values, such as RGB or YUV as is commonly used in videos or images.

There are two competing approaches to coding of attributes under consideration: Level of Details (LoD) and Region-Adaptive Hierarchical Transforms (RAHT). LoD is described, for example, in "*G-PCC codec description*", ISO/IEC JTC1/SC29/WG11, Macao, output document w18015, December 2018. RAHT is described, for example, in ""*Compression of* 3D *point Cloud Using a Region-Adaptive Hierarchical Transform*", R. L. de Queiroz, P. A. Chou, IEEE Transactions on Image Processing, vol 25 (8), August 2016".

In general, LoD involves sampling the point cloud (PC) at several levels 1 to L of details to obtain increasing sets of points $E_1 \subset \ldots \subset E_l \subset \ldots \subset E_L = PC$. Attributes are coded hierarchically, first for points in $E_1$, then points in $E_2$ (not in $E_1$), etc. Already coded attributes in $E_{l-1}$, are used as predictors of attributes in $E_l$; for instance, by computing a weighted average of neighbouring already coded attributes, subtracting this average to the original attribute to obtain a residual, and coding this residual. This approach has similarities to scalable video coding.

LoD finds efficient application in the case of dense point clouds, such as may be encountered in VR applications for example. It does not necessarily perform well in the case of sparse point clouds due to the lack of local correlation, such as those produced by LiDAR, for example. LoD is also relatively computationally demanding as it works on an unstructured geometry for the points of neighbouring already coded attributes, i.e. the search of neighbouring points may be demanding in particular in sparse point clouds because neighbouring points do not necessarily belong to neighbouring nodes of the octree, making the use of the octree to find neighbouring points inefficient.

RAHT is a form of 3D transform that is applicable to 2×2×2 cubes and is applied by successively carrying out 2-point transforms in the X, Y and Z directions to generate a set of AC coefficients and eventually reducing the cube to one DC coefficient through the successive transforms. RAHT is orthonormal and relatively easy to implement in terms of computational complexity. RAHT finds efficient application in the case of sparse point clouds, but does not necessarily perform well in the case of dense point clouds. Further details regarding RAHT transforms are provided below.

In accordance with one aspect of the present application, methods and devices are described for coding point cloud attributes that perform well compared to both LoD and RAHT irrespective of whether the point cloud is dense or sparse. The methods and devices may involve using a transform per node, rather than per direction as in RAHT, although in some embodiments the transform may be a direction-specific transform, of which RAHT is a possible example. In some cases, the methods and devices may include prediction of attributes and, in particular, inter-depth prediction of attributes. In some cases, a sum of attributes for a parent node at one depth level is, at least in part, used to predict the sum of attribute values associated with its child sub-volumes at the next depth level. In some such cases, attribute data from one or more neighbours to the parent node may be used in predicting the sum of attribute values for the child sub-volumes. The sum of attributes used may be a geometry-weighted or a mean sum of attributes in some cases. In at least one example, the prediction operation applies a weight to a neighbouring attribute from a neighbouring node that reflects the (inverse of the) geometric distance of the neighbouring node to the child sub-volume for which an attribute value is to be predicted.

Transforms offer the possibility of compression gains, as seen in image and video coding, through mapping pixel or voxel domain data to a spectral domain. The resulting transform domain data includes a DC component and a plurality of AC components. By concentrating data in the DC component and a few lower frequency AC components, the overall compression may be improved. In some cases, this is further combined with quantization of coefficients in a lossy coding scheme to further improve data compression, at a cost of introducing distortion to the coded data relative to the original data.

A difficulty in point cloud compression as compared to video or image compression is that there may not be a point in every position of the partitioned volume. Towards the leaf nodes of the coding tree, some sub-volumes may contain a point and some sub-volumes may not.

FIG. 1 shows one example of an octree-based point cloud geometry as reflected at a depth d and a greater depth d+1. At the depth d, the occupied sub-volumes are indicated by shading. A current sub-volume 102 is indicated by darker shading. At depth d+1, the child sub-volumes 104 of the current sub-volume 102 are shown by shading. At the depth of highest resolution, the occupied child sub-volumes 104 each contain a respective point of the point cloud and, in this example, each point has a respective attribute value(s).

Figure 2:
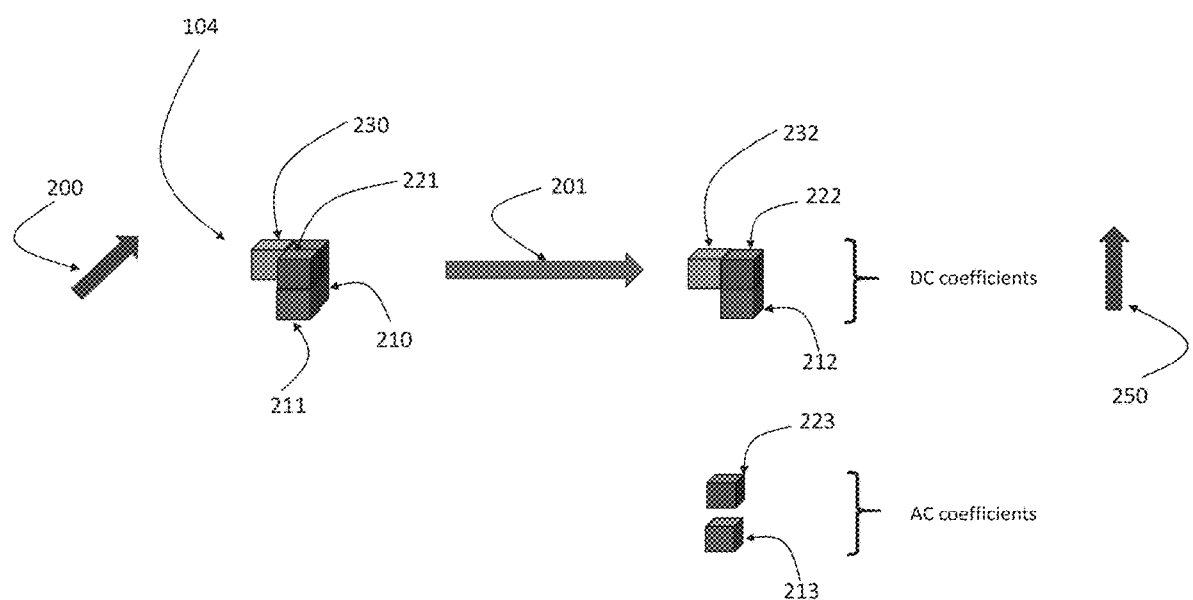
FIG. 2 shows the application of a 2-point transform to example child sub-volumes.

The RAHT starts at the deepest level, i.e. highest resolution, where each occupied sub-volume contains a single point. To use RAHT for attribute data compression, the two-point transform is first applied in one direction (x, y, or z). FIG. 2 graphically illustrates the application 201 of a 2-point transform to the example child sub-volumes 104 when applied along a direction 200. If two child sub-volumes aligned in the direction of transform are occupied, i.e. have respective attribute values, then the RAHT converts them into a DC component and an AC component. If the attributes are given by $c_1$ and $c_2$, respectively, then the RAHT may be expressed as:

$$\begin{bmatrix} DC \\ AC \end{bmatrix} = RAHT(w_1, w_2) \begin{bmatrix} c_1 \\ c_2 \end{bmatrix}$$

For example, as depicted on FIG. 2, the attributes $c_1$ and $c_2$ of the two respective child sub-volumes 210 and 211 are transformed by the two-point RAHT transform into a DC coefficient, associated with a merged sub-volume 212, and an AC coefficient 213. The same process applies to the attributes of the sub-volumes 220 and 221 transformed into a DC coefficient, associated with the merged sub-volume 222, and an AC coefficient 223. The volume 230 being not aligned with another sub-volume along the direction 200, it is not transformed (or equivalently transformed using a one-point transform, that is the identity transform, to obtain a DC coefficient), and its (non-) transformed attribute, i.e. the DC coefficient, is associated with the merged sub-volume 232.

The elementary transform RAHT (w1, w2) may be defined as:

$$RAHT(w_1, w_2) = \frac{1}{\sqrt{w_1 + w_2}} \begin{bmatrix} \sqrt{w_1} & \sqrt{w_2} \\ -\sqrt{w_2} & \sqrt{w_1} \end{bmatrix}$$

where $w_1$ is the number of points encompassed by the first child sub-volume, and $w_2$ is the number of points encompassed by the second child sub-volume. In the case of the deepest level, the number $w_i$ is 1. After elementary transformation, the AC coefficient is coded, and the DC coefficient is kept as the new information associated with the merging of the two sub-nodes. The merged sub-volumes have an associated number of points given by the sum $w_1 + w_2$.

By construction, the merged sub-volumes form a set of volumes belonging to a 2D structure perpendicular to the direction of transformation. For examples, merged sub-volumes 212, 222 and 232 belong to the plane perpendicular to the direction 200. The method can then be applied recursively along a second direction 250 perpendicular to the first direction 200.

Figure 3:
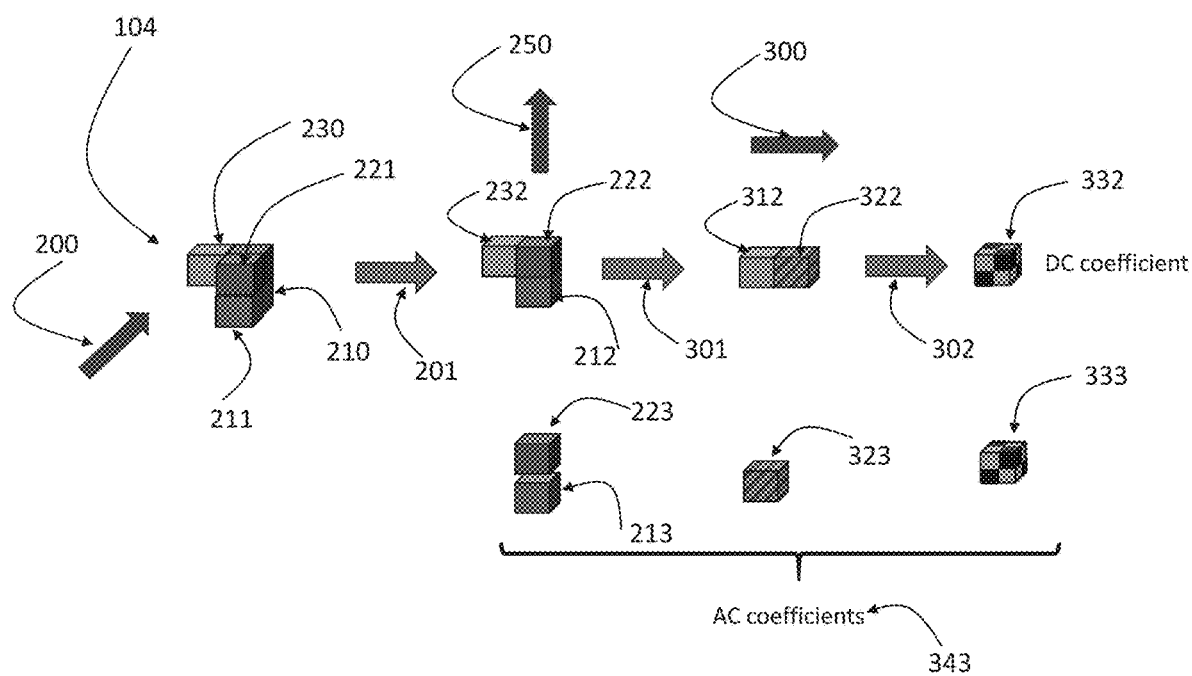
FIG. 3 illustrates the recursive application of a Region-Adaptive Hierarchical Transform in three directions for the example child nodes.

FIG. 3 illustrates the recursive applications 201, 301 and 302 of RAHT along the three successive orthogonal directions 200, 250 and 300 for the example child nodes 104. The second application 301 of RAHT, along the direction 250, to the merged sub-volumes 212, 222 and 232 provides two DC coefficients associated with the further merged sub-volumes 312 and 322, and one AC coefficient 323. The two further merged sub-volumes 312 and 322 belong to a 1D structure perpendicular to the two directions 200 and 250, i.e. these sub-volumes are aligned along the direction 300 perpendicular to the first two 200 and 250. Then, the third application 302 of RAHT, along the direction 300, to the further merged sub-volumes 312 and 322 provides a unique DC coefficient 332 and an AC coefficient 333.

Consequently, the recursive application of RAHT on the child node 104 provides a unique DC coefficient 332 and a set 343 of AC coefficients (213, 223, 323 and 333 in the example of FIG. 3). It is understood that this property holds whatever the configuration of occupied sub-volumes in the child node 104.

The AC coefficients 343, obtained from application of RAHT to the three directions, are coded in the bit-stream. The obtained unique DC coefficient 332 becomes the "attribute data" for the parent node in the next round of recursive coding in which the parent node and its seven siblings in the octree are coded using the same RAHT process. That process continues recursively in a bottom-up manner, up to the root node. At the root node, the AC coefficients and the final DC coefficients are encoded in the bitstream.

Top-Down Attribute Coding

In one aspect of the present application, instead of using a bottom-up recursive transform like RAHT, the coding process is top-down, i.e. starting from the root node and progressing downwards towards the level of sub-volumes containing individual points. Also, as noted above, in some implementations a "whole node" transform is applied to find a DC coefficient and associated AC coefficients for a sub-volume.

In another aspect of the present application the transform is applied to a set of geometry-weighted sums of attributes for sub-nodes within node; the decoded geometry-weighted sum of attributes per sub-volume corresponds to the respective DC coefficients of the transform at the next level down.

In yet a further aspect of the present application, inter-depth prediction may be incorporated. Inter-depth prediction may be used to predict the attribute values of child nodes. More particularly, the prediction may be a prediction of the geometry-weighted sum of attribute values in the child node. This prediction of the geometry-weighted sum of attributes is subtracted from the actual or original geometry-weighted sum of attributes to obtain a residual geometry-weighted sum of attributes. Note that the transform may be applied prior to subtraction or after subtraction. After transform of the residuals (or transform of the prediction and originals prior to finding their difference) a set of residual AC coefficients results. The AC coefficients are encoded. Note that the DC coefficient need not be encoded since it is known from inverse transform of the coefficients at the preceding (parent) level.

At the encoder, the geometry is known, so the number of points per sub-volume is known. At the decoder the locations of points within space is also known from the decoding of the compressed point cloud geometry. Accordingly, both the encoder and decoder have the structural information to know if sub-volumes contain points or not, and the number w of points encompassed by each node may be found using a simple bottom-up process in the octree.

The number of points in any given sub-volume may be designated as w, where w is the number of points in a sub-volume at a depth d. For each point p an attribute value may be designated as attribute(p). The sum of attribute values in a given node may be given by:

$$A_{node} = \sum_{p \in node} attribute(p)$$

The mean value of the attributes in a node is then:

$$a_{node} = A_{node}/w_{node}$$

A geometry-weighted sum of attribute values may then be defined as $A_{node}/\sqrt{w_{node}}$.

The transform of attribute information occurs in the domain $A/\sqrt{w}$. This domain is used because the construction of the orthonormal transforms implies a "DC coefficient property", namely that the $$DC\ coefficient = \frac{1}{\sqrt{w}} \sum_{i=1}^{w} attribute_i = A/\sqrt{w}.$$

The quantity being determined for each sub-volume from the root node down to the leaf nodes is the geometry-weighted sum of attributes:

$$\frac{1}{\sqrt{w}} \sum_{i=1}^{w} attribute_i = A/\sqrt{w}.$$

This corresponds to the DC coefficient of that node when transforming the geometry-weighted sum of attributes for its set of child nodes. This will allow for a top-down coding process in which each layer inherits its DC value, i.e. the geometry-weighted sum of attributes for the parent node, from the inverse transform at the parent node level.

When encoding a set of child nodes within a node, the encoder determines the geometry-weighted sum of attributes $A/\sqrt{w}$ for each child node. If there are k child nodes, and the transform is designated T, then the encoder applies the transform to the set of k child nodes to produce the transform domain coefficients:

$$\begin{bmatrix} DC \\ AC_1 \\ \vdots \\ AC_{k-1} \end{bmatrix} = T_{node} \begin{bmatrix} A_1/\sqrt{w_1} \\ \vdots \\ A_k/\sqrt{w_k} \end{bmatrix}$$

The DC coefficient is already known as the quantity $A/\sqrt{w}$ from the parent node. Accordingly, the encoder encodes the AC coefficients and then proceeds to perform the same process within each of the child nodes.

The decoder begins at the root node and decodes the root DC coefficient and the AC coefficients, and then inverse transforms them to obtain the decoded quantities $A_i/\sqrt{w_i}$ for the child nodes of the root node. The decoder then, for each of those child nodes, uses the decoded quantity $A_i/\sqrt{w_i}$ for the ith child node as the (decoded) DC coefficient for that child node, decodes the AC coefficients, and applies an inverse transform to obtain the decoded geometry-weighted sum of attributes $A_i/\sqrt{w_i}$ for each of the grandchild nodes within that child node. This process repeats until the decoding reaches the leaf nodes and obtains the final decoded attribute values.

It will be appreciated that quantization may be applied to the transform domain coefficients to introduce lossy coding in some implementations.

Figure 4:
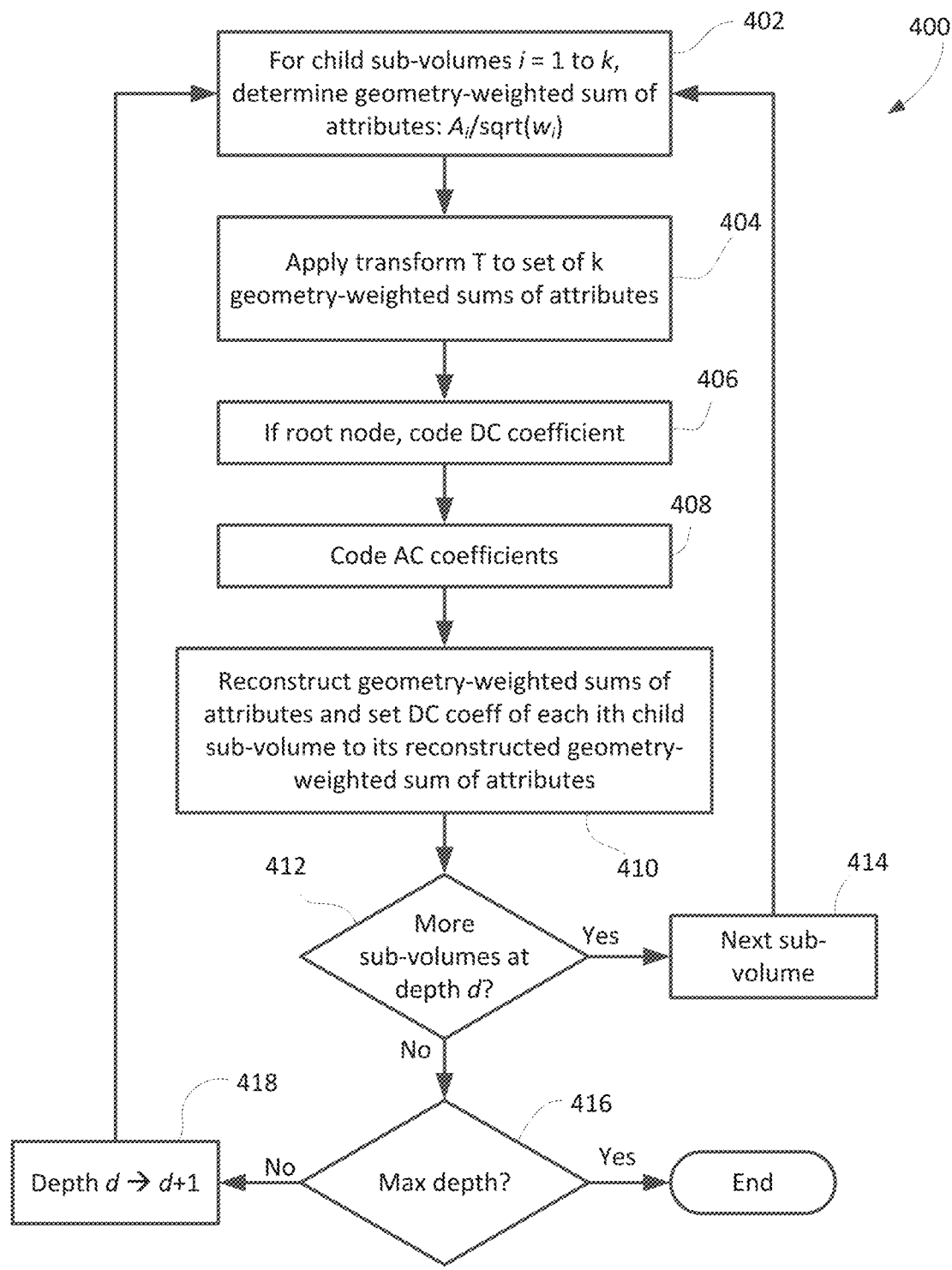
FIG. 4 shows a flowchart of one example method of encoding attribute data for a point cloud.

Reference will now be made to FIG. 4, which shows a flowchart of one example method 400 of encoding attribute data for a point cloud. The method 400 presumes that the three-dimensional space within which the point cloud data is located has been suitably partitioned using a tree-based recursive partitioning, such as an octree. From that partitioning, and the coding of the geometry, the encoder knows which leaf nodes contain a point and, as a result, the number w of points in each sub-volume (node) internal to the tree. Likewise, the encoder knows from the original point cloud data, the attribute value associated with each point of the point cloud. As noted above, the attribute may be colour, reflectance, or any other characteristic.

The method 400 begins in operation 402, for coding a current (parent) node at depth d, with determining the geometry-weighted sum of attributes $A_i/\sqrt{w_i}$ for each child node at depth d+1 within the current (parent) node. In operation 404, the set of geometry-weighted sum of attributes for the child nodes is transformed to produce a set of transform domain coefficients. The transform T used in operation 404 conforms to the DC coefficient property, whereby the DC coefficient $$DC = \frac{1}{\sqrt{w}} \sum_{i=1}^{w} attribute_i = A/\sqrt{w}.$$

In operation 406, if the current node is the root node, then the DC coefficient is encoded. The encoding may be entropy encoding. If the current node is not the root node, then the DC coefficient is not encoded, since the decoder will already know the DC coefficient from having decoded the coefficients at the depth above.

In operation 408, the AC coefficients are encoded. The encoding may be entropy encoding.

If the process is lossy, e.g. the transform includes a quantization step to quantize the transform domain coefficients, then in operation 410, the encoder reconstructs, as a decoder would do, the (decoded) geometry-weighted sum of attributes $A_i/\sqrt{w_i}$ for the child nodes by dequantizing and inverse transforming the quantized transform domain coefficients. It then sets the DC coefficient for each child node to its reconstructed geometry-weighted sum of attributes.

In operation 412, the encoder assesses whether there are further nodes to encode at the current depth d. If so, then it moves to the next sub-volume at depth d, as indicated by operation 414, and returns to operation 402. If not, then it determines whether it is at the maximum depth in operation 416. If so, then it ends and, if not, then it moves to the next lower depth d→d+1 in operation 418 and returns to operation 402 to continue coding at the next level. It will be appreciated that this example is a breadth-first coding example.

Figure 5:
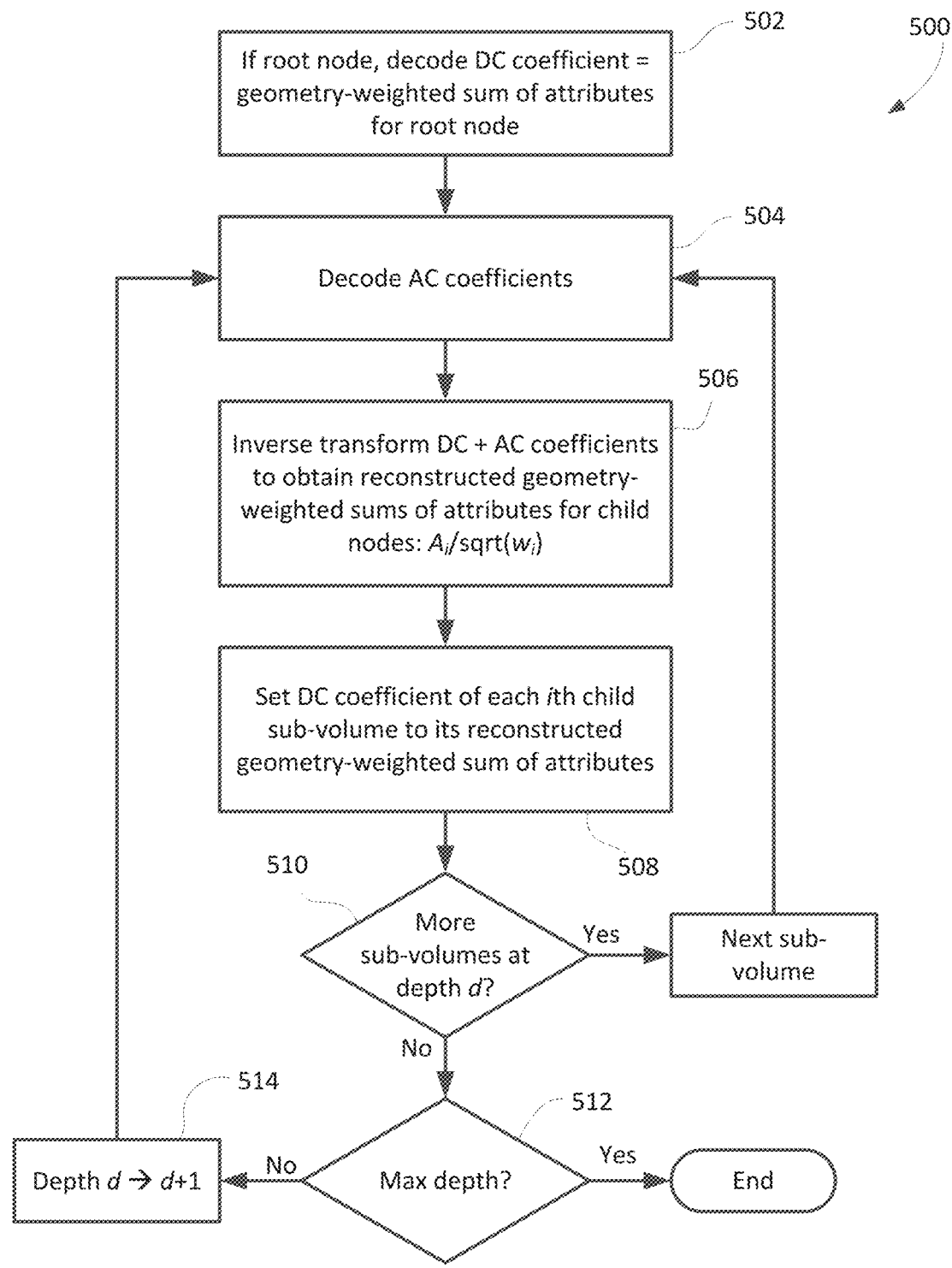
FIG. 5 shows a flowchart of an example method of decoding compressed attribute data for a point cloud.

Reference will now be made to FIG. 5, which shows a flowchart of an example method 500 of decoding compressed attribute data for a point cloud. The method 500 presumes that the decoder has decoded the geometry of the point cloud, so the locations of the points in the partitioned three-dimensional space are determined. Accordingly, the decoder knows the number w of points in each sub-volume in the tree-based structure of the coded point cloud.

The method 500 begins in operation 502. If the current node is the root node, then the decoder decodes the DC coefficient. In operation 504, the decoder decodes the AC coefficients for the current node from the bitstream. It then combines the DC coefficient with the decoded AC coefficients and inverse transforms (and dequantizes, if applicable) the coefficients to produce a set of decoded geometry-weighted sum of attributes, $A_i/\sqrt{w_i}$. These are the decoded geometry-weighted sum of attributes associated with the child nodes to the current node. Moreover, each decoded geometry-weighted sum of attributes for a node serves as the (decoded) DC coefficient for that node when coding the node at the next level. Accordingly, the decoder may set the (decoded) DC coefficient for each child node to its corresponding reconstructed geometry-weighted sum of attributes in operation 508.

In operation 510 the decoder assesses whether there are further nodes at the current depth d. If so, then it returns to operation 504 to continue decoding. If not, then in operation 512 the decoder determines whether it is at the maximum depth already (e.g. the leaf nodes) and, if so, then it ends. If it is not at the maximum depth, then it moves to the next depth level, d→d+1, and returns to operation 504.

Top-Down Coding with Inter-Depth Prediction

As noted above, inter-depth prediction may be applied to improve compression performance. The inter-depth prediction process uses information from a parent depth, such as attribute information from nodes neighbouring the parent node, to predict attribute information for child nodes. This prediction is then subtracted from the actual attribute information at the child node level and the residual data is encoded. The use of parent level attribute information, such as from neighbouring nodes, to predict attribute information at the child depth may be termed "up-sampling".

A "neighbouring node" may, in some examples, include nodes that are siblings to the parent node within a sub-volume, e.g. the seven siblings in an octree structure. In some examples, a "neighbouring node" may include nodes that share a face with the parent node. In some examples, a "neighbouring node" may include nodes that share an edge with the parent node. In some examples, a "neighbouring node" may include nodes that share a vertex with the parent node.

Because the data being encoded in these examples is the geometry-weighted sum of attributes, $A/\sqrt{w}$, the prediction operation aims to predict the geometry-weighted sum of attributes. However, the magnitude of $A/\sqrt{w}$ depends on the number of points w, meaning that $A/\sqrt{w}$ grows asymptotically as $\sqrt{w}$ when w is large. Accordingly, in some implementations, in order to perform the inter-depth prediction in a bounded domain, the up-sampling process is performed in the mean attribute domain, e.g. a=A/w, which is naturally bounded by the attribute value range. The geometry-weighted sum of attributes for a node may be converted to the mean attribute domain through division by $\sqrt{w}$. That is, the mean sum of attributes a is obtained as $a=(A/\sqrt{w})/\sqrt{w}$.

The bounded property of the mean attribute domain is advantageous as it correlates to a more physical meaning (mean attribute is a physical quantity, e.g. mean colours, for instance, but geometry-weighted sum of attributes is not in general) and numerical stability of the up-sampling process, thus leading to a more efficient prediction. Also, having a bounded domain simplifies fixed point implementations.

The mean sum of attributes values at depth d may then be used in an up-sampling process to predict up-sampled mean sum of attribute values at depth d+1. The mean sum of attributes values may be those from the parent node and/or one or more neighbouring nodes. Any one of a number of possible up-sampling operations may be used, some examples of which will be described further below. The predicted up-sampled mean sum of attribute values, $a_{up}$, may then be converted to predicted up-sampled geometry-weighted sum of attributes as $a_{up} \cdot \sqrt{w}$ at depth d+1, e.g. for the child nodes. Therefore, the up-sampling results in predicted geometry-weighted sums of attributes for a set of child nodes. The encoder subtracts the predicted geometry-weighted sums of attributes from the actual (original) geometry-weighted sums of attributes to obtain residual values. These are then transformed to find the AC coefficients for coding.

In some cases, the transform is applied to the predicted geometry-weighted sums of attributes to obtain predicted coefficients, and the transform is applied to the original geometry-weighted sums of attributes to obtain original coefficients. The predicted coefficients are then subtracted from the original coefficients to obtain the AC coefficients for coding.

Figure 6:
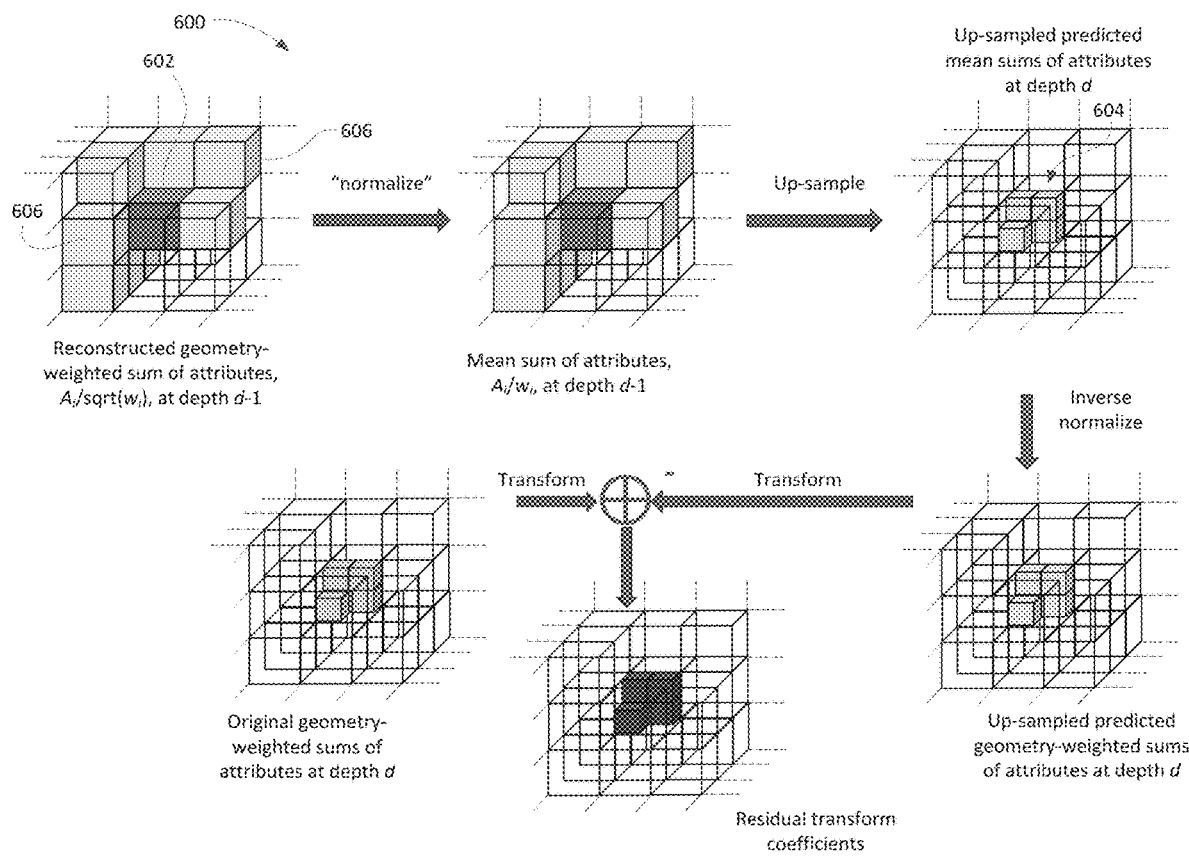
FIG. 6 diagrammatically illustrates an example encoding process for point cloud attributes using top down coding and inter-layer prediction.

Reference is now made to FIG. 6, which diagrammatically illustrates an example encoding process 600 for point cloud attributes using top down coding and inter-layer prediction. The process 600 is applied to code attribute information for the nodes within a parent sub-volume 602. The parent sub-volume 602 is partitioned into a set of child sub-volumes 604 at depth d.

At depth d−1 the parent sub-volume 602 has neighbouring occupied sub-volumes 606. In this example, the set of neighbouring sub-volumes 606 may include any occupied sub-volumes at depth d−1 that share a vertex with the parent sub-volume 602. The encoder determines the geometry-weighted sum of attributes, $A_i/\sqrt{w_i}$, for the parent node and each of the neighbouring nodes. These geometry-weighted sums of attributes may be the "reconstructed" (decoded) geometry-weighted sums of attributes from decoding the coded coefficient data for their respective sub-volumes and inverse transforming the coefficients to reconstruct the geometry-weighted sums, particularly if the coding is lossy due to the use of quantization in the transform process. In that way, the encoder ensures it is working with the same data that the decoder will have available to it.

The encoder then applies "normalization" to convert the geometry-weighted sum of attributes, $A_i/\sqrt{w_i}$, for the parent sub-volume 602 and each of the neighbouring sub-volumes 606 at depth d−1 to the mean attribute domain by dividing by the respective $\sqrt{w_i}$ values. These values are known to both the encoder and decoder since the geometry of the point cloud is known to both. As a result, the encoder determines the mean sum of attributes, $A_i/w_i$, for each of the parent node and for each of its occupied neighbouring nodes. Using these values, the encoder applies an up-sampling operation to generate a predicted mean sum of attributes, $A_{i,up}/w_i$, for each occupied child sub-volume 604 of the parent sub-volume 602.

The encoder then inverse normalizes the predicted mean sum of attributes to obtain a predicted geometry-weighted sum of attributes, $A_{i,up}/\sqrt{w_i}$, for each of the occupied child sub-volume 604.

In this example, the encoder then transforms the predicted geometry-weighted sum of attributes to obtain predicted transform domain coefficients. The original geometry-weighted sum of attributes, $A_{i,orig}/\sqrt{w_i}$, for each child sub-volume 604 is determined by the encoder, and is transformed to generate original transform domain coefficients. The predicted AC coefficients are subtracted from the original AC coefficients to realize residual AC coefficients, which the encoder then entropy encodes to output a bitstream of encoded data for the parent node 602.

Figure 7:
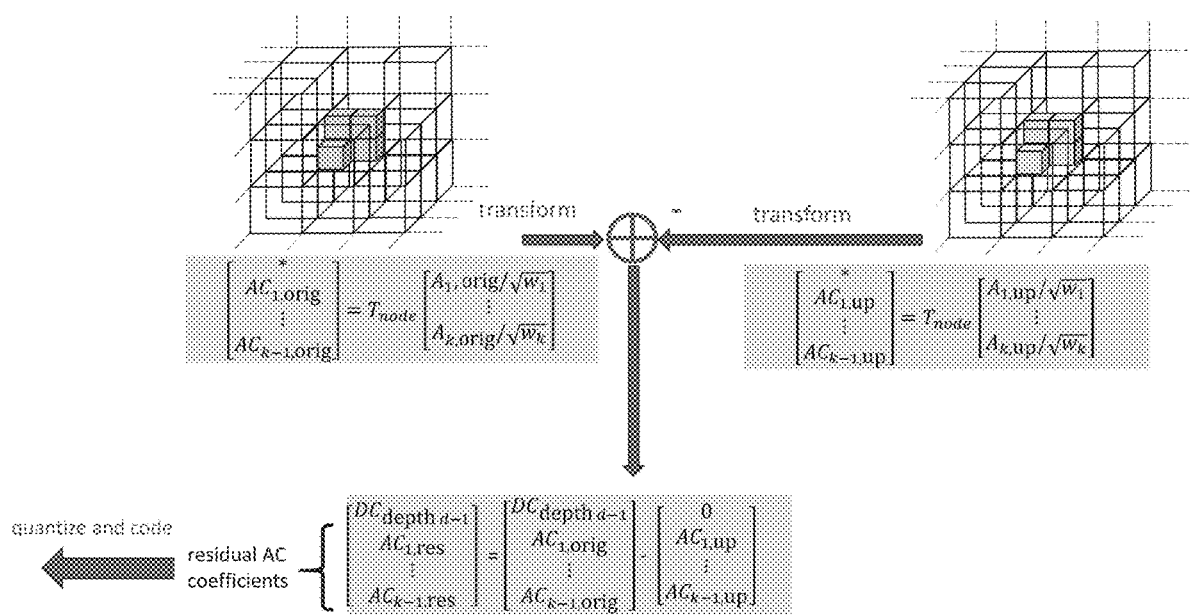
FIG. 7 diagrammatically illustrates the determination of the residual AC coefficients in the process of FIG. 6.

FIG. 7 diagrammatically illustrates the determination of the residual AC coefficients through subtraction of the predicted coefficients from the original coefficients.

Figure 8:
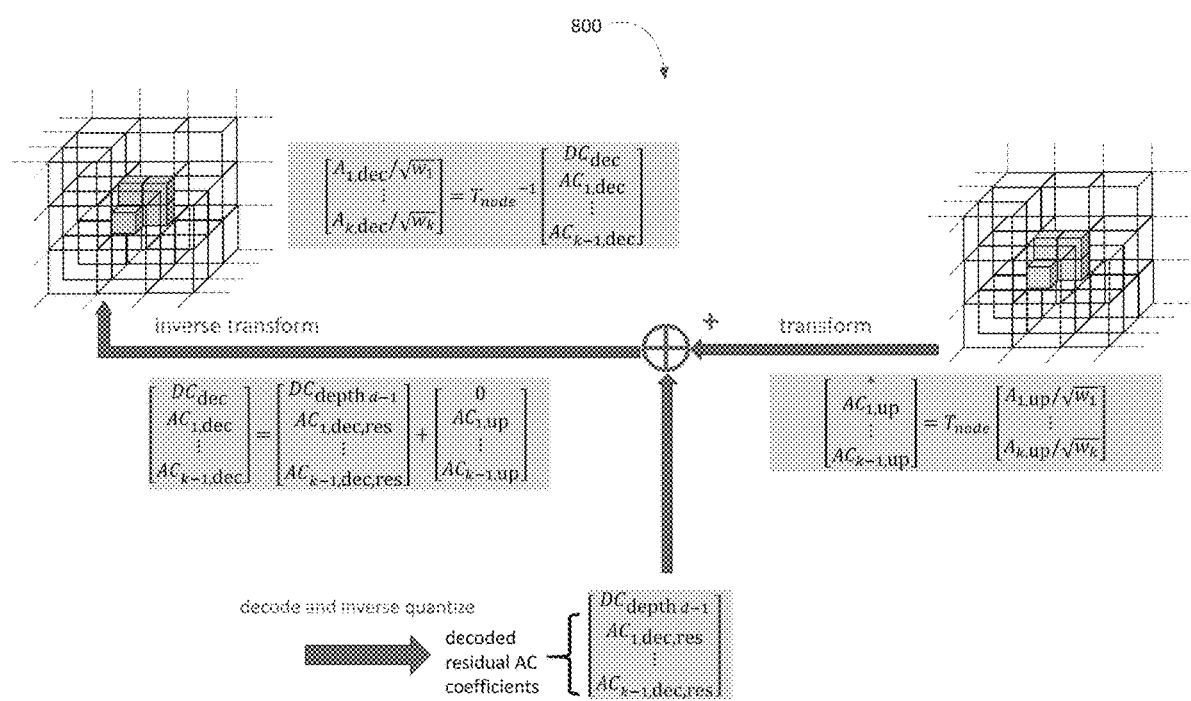
FIG. 8 diagrammatically illustrates an example decoding process.

FIG. 8 diagrammatically illustrates an example of the decoding process 800. The decoder employs the same prediction process to generate the predicted geometry-weighted sum of attributes $A_{i,up}/\sqrt{w_i}$. It also reconstructs the residual AC coefficients through entropy decoding and inverse quantization. Note that the DC coefficient is not directly obtained from the bit-stream, but instead is known to the decoder from having reconstructed and inverse transformed coefficients at the parent depth d−1. The (decoded) DC component is given by the reconstructed geometry-weighted sum of attributes for the parent node, $DC=A_{i,depth\ d-1}/\sqrt{w_i}$.

The predicted AC coefficients are then added to the reconstructed residual AC coefficients to produce the reconstructed AC coefficients. These may alternatively be referred to herein as the decoded coefficients. The DC coefficient obtained from the parent depth and the reconstructed AC coefficients are then subjected to an inverse transform to obtain reconstructed geometry-weighted sum of attributes $A_{i,rec}/\sqrt{w_i}$ for the child sub-volumes 604 at depth d=1.

Figure 9:
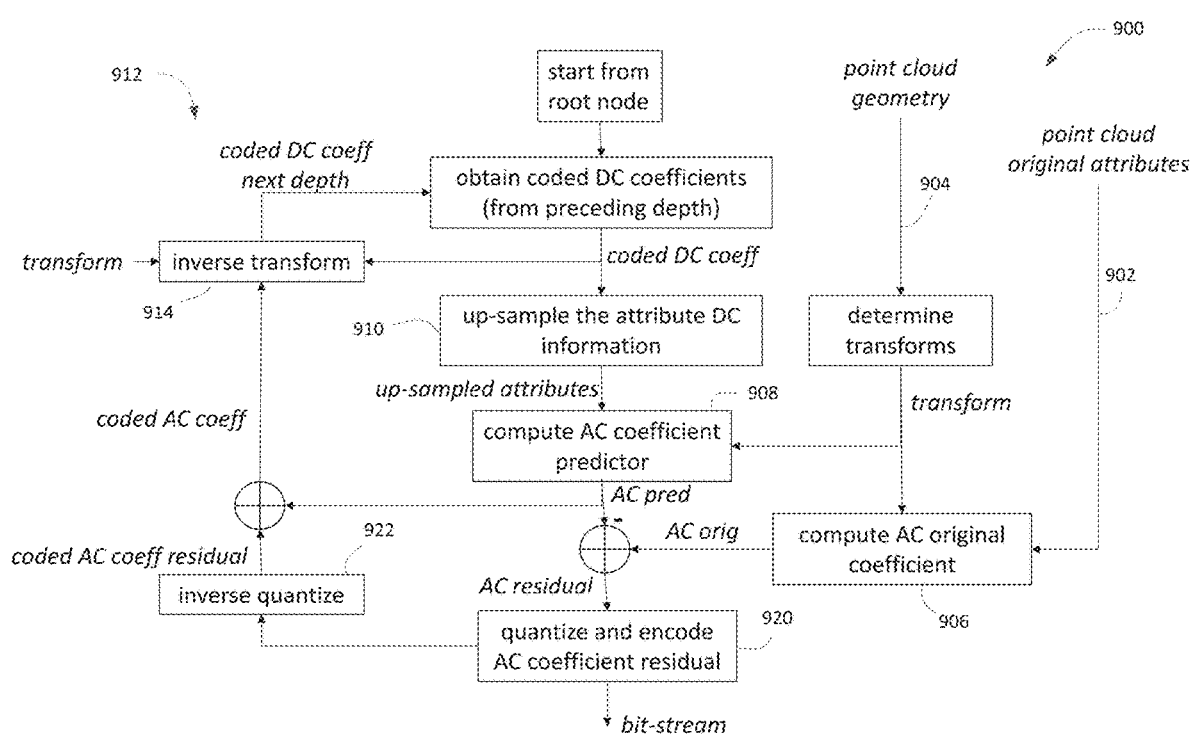
FIG. 9 shows, in block diagram form, an example encoder.

Reference is now made to FIG. 9, which shows, in block diagram form, an example encoder 900 for coding attribute data for a point cloud. The encoder 900 may be implemented using a combination of hardware and software, such one or more processing units, memory, and processor-readable instructions. Portions of the encoder 900 relating to coding of the geometry of the point cloud or ancillary elements, such as input, output, user interface devices, or other such components, are not illustrated for clarity and ease of explanation.

The encoder 900 has the original point cloud attribute information 902 and the point cloud geometry 904. The encoder 900 includes a DC coefficient property-compliant transform operator 906 to transform the original point cloud attributes, in the form of geometry-weighted sum of attributes, into transform domain coefficients.

The same transform operator 908 is applied to predicted geometry-weighted sum of attributes obtained from a prediction/up-sampling operator 910 that uses as its inputs the geometry-weighted sum of attributes from a parent node and one or more of its neighbours, i.e. at a depth above. The output of the transform operator 908 is a set of predicted AC coefficients, which are then subtracted from the original AC coefficients from the transform operator 906 to produce residual AC coefficients. Those residual AC coefficients are quantized and encoded by a quantizer and encoder 920 to produce an output bitstream of compressed point cloud attribute data.

The inputs to the prediction/up-sampling operator 910 are supplied by way of a decoding feedback loop 912 in which the quantized residual AC coefficients are inverse quantized in an inverse quantizer 922, and are then added to the predicted AC coefficients to produce reconstructed AC coefficients. Together with the DC coefficient, the set of coefficients is then inverse transformed by an inverse transform operator 914 to produce reconstructed geometry-weighted sums of attributes for the child nodes to the current node, which will then serve as inputs to the prediction operation for the next level down.

Figure 10:
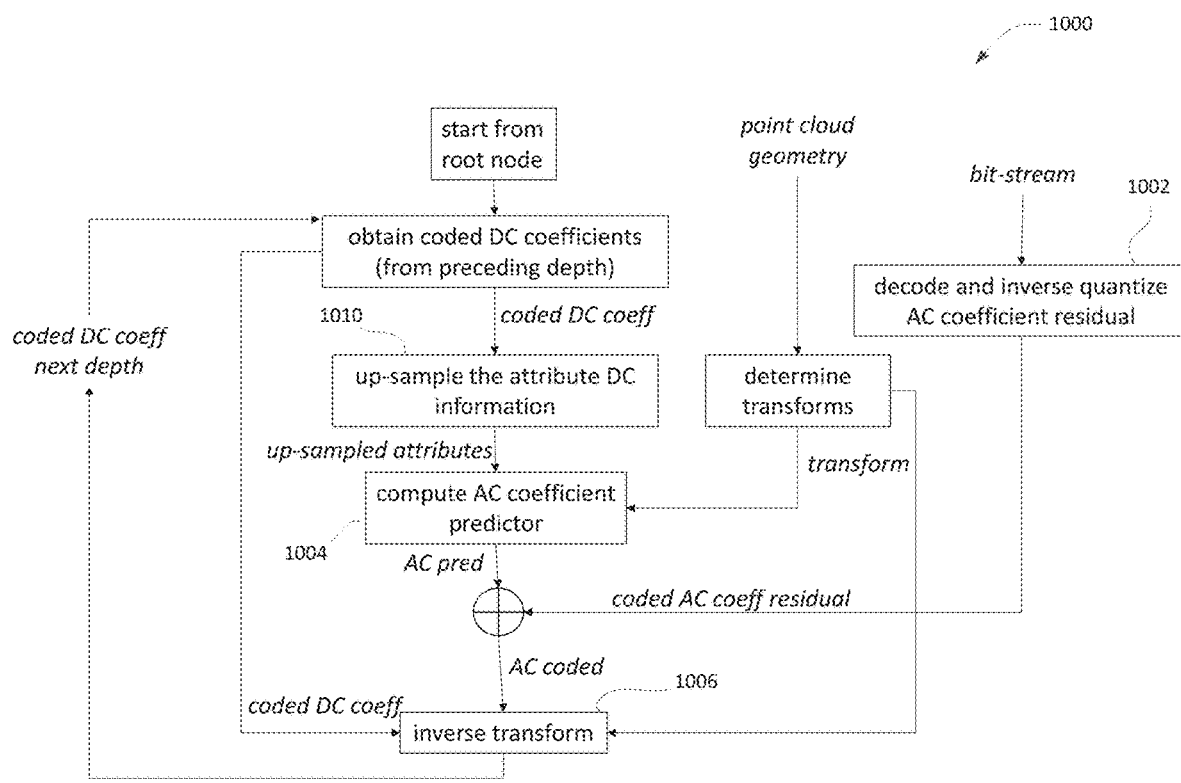
FIG. 10 shows, in block diagram form, an example decoder.

An example of a corresponding decoder 1000 is illustrated in block diagram form in FIG. 10. The decoder 1000 has the point cloud geometry available to it from having previously decoded the point cloud location data. Elements relating to that decoding are not necessarily illustrated for ease of explanation.

The decoder 1000 includes a decoder and inverse quantizer 1002 to decode and inverse quantize the residual AC coefficients encoded in the bitstream. The decoder 1002 includes a prediction/up-sampling operator 1010 that mirrors the same component 910 (FIG. 9) from the encoder 900 (FIG. 9). The prediction/up-sampling operator 1010 takes in decoded/reconstructed geometry-weighted sum of attribute data from the depth above, e.g. the parent node and one or more neighbouring nodes, and produces predicted geometry-weighted sums of attributes. Those are subjected to a transform 1004 to produce predicted AC coefficients. Those predicted AC coefficients are added to the reconstructed residual AC coefficients from the decoder and inverse quantizer 1002 to produce reconstructed AC coefficients. An inverse transform 1006 is applied to obtain reconstructed geometry-weighted sum of attributes for the current nodes. As the decoder 1000 processes the data in a top-down reconstruction, once it reaches leaf nodes, this decoded inverse transformed attribute data results in reconstructed attribute information for each point.

Up-Sampling Operation

As noted above, the prediction operation employs up-sampling of attribute information from depth d−1 to produce predicted geometry-weighted sums of attributes for nodes at depth d. In these examples, the up-sampling is performed in the mean sum of attribute, A/w, domain to ensure a bound on values to be up-sampled and numerical stability, but it will be appreciated that prediction operations in the domain A/$\sqrt{w}$ may be used in some implementations.

Figure 11:
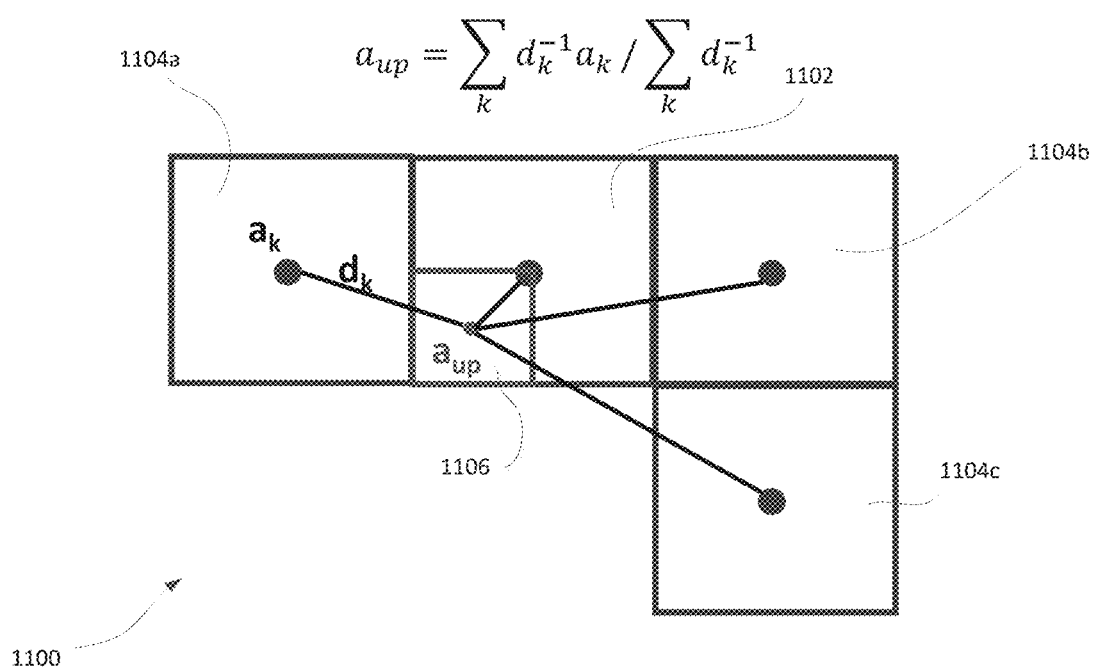
FIG. 11 shows, in two-dimensional diagrammatic form, an example up-sampling process.

Reference will now be made to FIG. 11, which shows, in two-dimensional diagrammatic form, an up-sampling process 1100. At depth d−1, there is a parent node 1102, and neighbouring nodes 1104a, 1104b, and 1104c (collectively, 1104). For clarity and ease of explanation, this example is illustrated in two-dimensions, but extension to three-dimensions will be understood in light of the description herein.

The parent node 1102 has a child node 1106 for which attribute information is to be predicted. The DC coefficients for the parent node 1102 and each of the neighbouring nodes 1104 are known. Since the geometry of the tree is already known from encoding/decoding the point cloud geometry, the number of points w in any node is already known to both the encoder and decoder. Accordingly, the DC coefficients, which are equivalent to the geometry-weighted sum of attributes A/$\sqrt{w}$, for the parent node 1102 and the neighbouring nodes 1104 may be converted to mean sums of attributes A/w by dividing by respective $\sqrt{w}$ values for the respective node.

An up-sampled operation is then applied to generate a predicted mean sum of attributes value $a_{up}$ for the child node 1106. That up-sampling operation takes, as inputs, the mean sums of attributes of the parent node 1102 and its occupied neighbouring nodes 1104. In this example implementation, the up-sampling operation further takes into account a distance metric relating the child node 1106 to the respective parent node 1102 and neighbouring nodes 1104. That distance metric may reflect a geometric distance between a centerpoint of the sub-volume corresponding to the child node 1106 and a centerpoint of the sub-volume corresponding to the respective parent node 1102 or neighbouring node 1104. The inverse $d_k^{-1}$ of the distance may reflect the relative weight of correlation between attribute information from a node at depth d−1 and a node at depth d. Other weighting factors, or additional weighting factors, may be used in other implementations of the up-sampling operation. In one example, the predicted mean sum of attributes for the child node 1102 may be given by the weighted sum:

$$a_{up} = \sum_k d_k^{-1} a_k / \sum_k d_k^{-1}$$

In some implementations, up-sampling may be implemented using a FIR (finite impulse response) filter.

Whole-Node Transforms

As noted above, a two-point RAHT transform may be applied successively in the x, y, and z directions to find the DC transform domain coefficient and AC coefficients for an octree-based sub-volume. Recall the formula of the RAHT transform is given by:

$$RAHT(w_1, w_2) = \frac{1}{\sqrt{w_1 + w_2}} \begin{bmatrix} \sqrt{w_1} & \sqrt{w_2} \\ -\sqrt{w_2} & \sqrt{w_1} \end{bmatrix}$$

In practical implementations, this transform is carried out in three cascading steps, for example through applying it in the X-direction, then the Y-direction, then the Z-direction. However, it is mathematically possible to combine two elementary RAHT transforms to obtain a single orthonormal three-point transform. The generalization to more points is done by induction. Let $A_i/\sqrt{w_i}$ be the attribute information associated with three nodes encompassing $w_i$ points each. A first elementary RAHT transform is applied to the first two nodes to obtain a first DC coefficient $DC_{2p}$, a first AC coefficient $AC_1$ and an unchanged third node information $A_3/\sqrt{w_3}$.

$$\begin{bmatrix} DC_{2p} \\ AC_1 \\ A_3/\sqrt{w_3} \end{bmatrix} = \begin{bmatrix} (A_1 + A_2)/\sqrt{w_1 + w_2} \\ AC_1 \\ A_3/\sqrt{w_3} \end{bmatrix} =$$

$$\frac{1}{\sqrt{w_1 + w_2}} \begin{bmatrix} \sqrt{w_1} & \sqrt{w_2} & 0 \\ -\sqrt{w_2} & \sqrt{w_1} & 0 \\ 0 & 0 & \sqrt{w_1 + w_2} \end{bmatrix} \begin{bmatrix} A_1/\sqrt{w_1} \\ A_2/\sqrt{w_2} \\ A_3/\sqrt{w_3} \end{bmatrix}$$

Then a second elementary RAHT transforms is applied to the first DC coefficient and the third node information. As a result, one gets a second DC coefficient $DC_{3p}=(A_1+A_2+A_3)/\sqrt{w_1+w_2+w_3}$ combining the three points, and two AC coefficients.

$$\begin{bmatrix} DC_{3p} \\ AC_1 \\ AC_2 \end{bmatrix} = \begin{bmatrix} (A_1 + A_2 + A_3)/\sqrt{w_1 + w_2 + w_3} \\ AC_1 \\ AC_2 \end{bmatrix} = \frac{1}{\sqrt{w_1 + w_2 + w_3}}$$

$$\begin{bmatrix} \sqrt{w_1+w_2} & 0 & \sqrt{w_3} \\ 0 & \sqrt{w_1+w_2+w_3} & 0 \\ -\sqrt{w_3} & 0 & \sqrt{w_1+w_2} \end{bmatrix} \begin{bmatrix} DC_{2P} \\ AC_1 \\ A_3/\sqrt{w_3} \end{bmatrix}$$

The orthonormal matrix of three-point orthonormal transform RAHT($w_1$, $w_2$, $w_3$) combining the two elementary two-point RAHT transforms is then the product:

$$RAHT(w_1, w_2, w_3) = \frac{1}{\sqrt{w_1+w_2+w_3}\sqrt{w_1+w_2}} \begin{bmatrix} \sqrt{w_1+w_2} & 0 & \sqrt{w_3} \\ 0 & \sqrt{w_1+w_2+w_3} & 0 \\ -\sqrt{w_3} & 0 & \sqrt{w_1+w_2} \end{bmatrix}$$

$$\begin{bmatrix} \sqrt{w_1} & \sqrt{w_2} & 0 \\ -\sqrt{w_2} & \sqrt{w_1} & 0 \\ 0 & 0 & \sqrt{w_1+w_2} \end{bmatrix}$$

Keeping this in mind, we might then consider graph transforms. Graph transforms are a generic framework to construct a transform on any set of points. The mathematical construction is detailed below.

Figure 12:
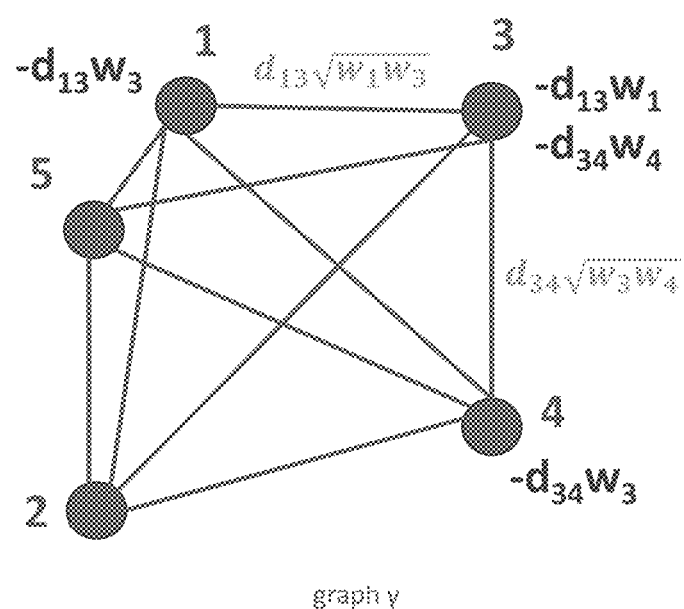
FIG. 12 illustrates an example graph reflecting five nodes or points.

Reference will now be made to FIG. 12, which illustrates an example graph reflecting five nodes or points. The set of points may be designated E. For two distinct points $p_i \neq p_j$ in E, a correlation factor $d_{ij}$ between these two points may be determined. In many example implementations, the correlation factor is a decreasing function of the distance between the two points. For example, one may take the inverse of the Euclidian distance (with a minus sign by convention):

$$d_{ij} = -1/\|p_j - p_i\|_2$$

Diagonal terms may be obtained by summing the terms line by line as follows:

$$d_{ii} = -\Sigma_{j \neq i} d_{ij}.$$

By construction, this matrix is symmetric and diagonal dominant. Consequently, it is diagonalisable in an orthonormal base:

$$D = V \Lambda V^T \text{ with } V^T = V^{-1}$$

A Laplace bi-linear operator may be defined to operate on a couple (a, b) of attributes associated with the points of the set E, by:

$$\text{Lap}(a,b) := a^T D b$$

A norm and distance may be deduced:

$$\|a\|_{Lap} := \text{Lap}(a,a) = a^T D a$$

$$d_{Lap}(a,b) := \|b-a\|_{Lap}$$

For example, this distance can measure the distortion $\Delta$ between an original attribute attribute and its coded version attribute$_{code}$ (in the expression below the symbol a is used in place of attribute):

$$\Delta = d_{Lap}(\alpha, \alpha_{code}) = (\alpha - \alpha_{code})^T D (\alpha - \alpha_{code})$$

Using the orthonormal decomposition of the matrix D, it is possible to obtain:

$$\|\alpha\|_{Lap} = \alpha^T D \alpha = \sum_i \lambda_i \alpha_i^2 V_i^T V_i$$

where $V_i$ is the i-th column of V. Therefore, the graph transform GT for the set of points E is naturally:

$$GT(E) := V^T$$

By construction this transform is orthonormal and well suited to attribute compression by applying firstly a constant step quantizer to transformed attribute coefficients, and secondly entropy coding the quantized coefficient. Graph transforms are powerful in term of compression efficiency when applied to big sets of points but are less practical than RAHT because the diagonal decomposition of the matrix must be performed with a typical complexity $O(N^2)$ for N points.

Considering still the graph of FIG. 12, consider it has N nodes with each node encompassing a respective number $w_i$ of points. A graph $\gamma$ is constructed from the centres of the cubes associated with the nodes. A "weighted graph transform" WGT($w_i$, $\gamma$) may be constructed from the graph $\gamma$ and the weights $w_i$. Such a transform would transform attribute information $c_i$ associated with the nodes into one DC coefficient and N−1 AC coefficients.

$$\begin{bmatrix} DC \\ AC_1 \\ \vdots \\ AC_{N-1} \end{bmatrix} = WGT(w_i, \gamma) \begin{bmatrix} c_1 \\ \vdots \\ c_N \end{bmatrix}$$

In some embodiments, to be compatible with attribute coding for point clouds, the transform is to reflect the relationship (using previous notations and w as the sum of the $w_i$):

$$DC = \frac{1}{\sqrt{w}} \sum_{i=1}^{w} A_i$$

which was termed the "DC coefficient property" above. Accordingly, a matrix D is defined with elements $d_{ij}$ as the Laplace matrix of the graph transform obtained for graph $\gamma$. Then a matrix $D^W$, namely the weighted Laplace matrix, may be defined by:

$$d_{ij}^W := d_{ij} \sqrt{w_i w_j} = -\sqrt{w_i w_j}/\|p_j - p_i\|_2$$

$$d_{ii}^W := -\sum_{j \neq i} d_{ij} w_j$$

Because this matrix is real and symmetric, it can be decomposed as follows:

$$D^W = V \Lambda V^T \text{ with } V^T = V^{-1}$$

and, similarly to non-weighted graph transforms, a weighted graph transform is defined by:

$$WGT(w_i, \gamma) := V^T$$

It can be shown that the kernel of the matrix $D^W$ is non-zero, $$D^W \cdot \begin{bmatrix} \sqrt{w_1} \\ \vdots \\ \sqrt{w_N} \end{bmatrix} = 0$$

and an associated column vector in the orthonormal decomposition V is:

$$V_1 = \frac{1}{\sqrt{w_1 + \ldots + w_N}} \begin{bmatrix} \sqrt{w_1} \\ \vdots \\ \sqrt{w_N} \end{bmatrix}$$

This indicates that the weighted graph transform WGT ($w_i, \gamma$) fulfils the DC coefficient property stated above. If all weights $w_i$ have the same value w, then weighted graph transforms are the same as the well-known non-weighted graph transforms. This is particularly true when applied to occupied leaf nodes where systematically w=1. Interestingly, the two-node weighted graph transform is the same as the two-point elementary RAHT transform:

$$WGT(w_1, w_2, Y_2) = RAHT(w_1, w_2) = \frac{1}{\sqrt{w_1 + w_2}} \begin{bmatrix} \sqrt{w_1} & \sqrt{w_2} \\ -\sqrt{w_2} & \sqrt{w_1} \end{bmatrix}$$

meaning the RAHT transform is a special case of the WGT.

The present encoding and decoding processes may employ any transform that complies with the DC coefficient property. This includes WGTs described above, including, but not limited to, RAHTs.

Application to Other Tree Structures

The examples described above are based on an octree geometry in which each node has eight children that divide the volume associated with the node into eight sub-volumes. The most common octrees have cubes (or cuboids) associated with the nodes and all cubes (or cuboids) of a same depth have a common size.

Another popular tree structure for point cloud representation are KD-trees. They basically split a volume into two sub-volumes, for example a cuboid into two sub-cuboids by splitting the initial cuboid along a plane parallel to a face. The two sub-cuboids do not necessarily have the same size, i.e. the partition may be unequal. The direction (among three) of splitting as well as the non-equality (if any) of the partition are needed information to represent the KD-tree.

The encoding and decoding processes described herein can be applied in the framework of KD-trees by applying directly the elementary RAHT transform to the two sub-volumes to obtain the transform $T_{node}$. The up-sampling process is naturally performed in the direction perpendicular to the splitting plane.

More generally, the encoding and decoding processes can be applied to any tree structure, as the up-sampling process using a weighted sum may be applied to any configuration of volumes and sub-volumes. For example, all neighbouring nodes within a fixed thresholding distance from a current node may be used for the up-sampling of mean attributes as predictor of the occupied child node of the current node. As long as the DC coefficient property holds, the principles described above are applicable to other structures, attributes, transforms, etc. The generalized Weighted Graph Transforms may be applied to any tree and ensure the DC coefficient property, thus providing another embodiment involving any tree structure.

Impact on Compression Performance

The described techniques may perform well on both dense and sparse point clouds. The may be compared to both RAHT-based processes and LoD-based processes.

Figure 13:
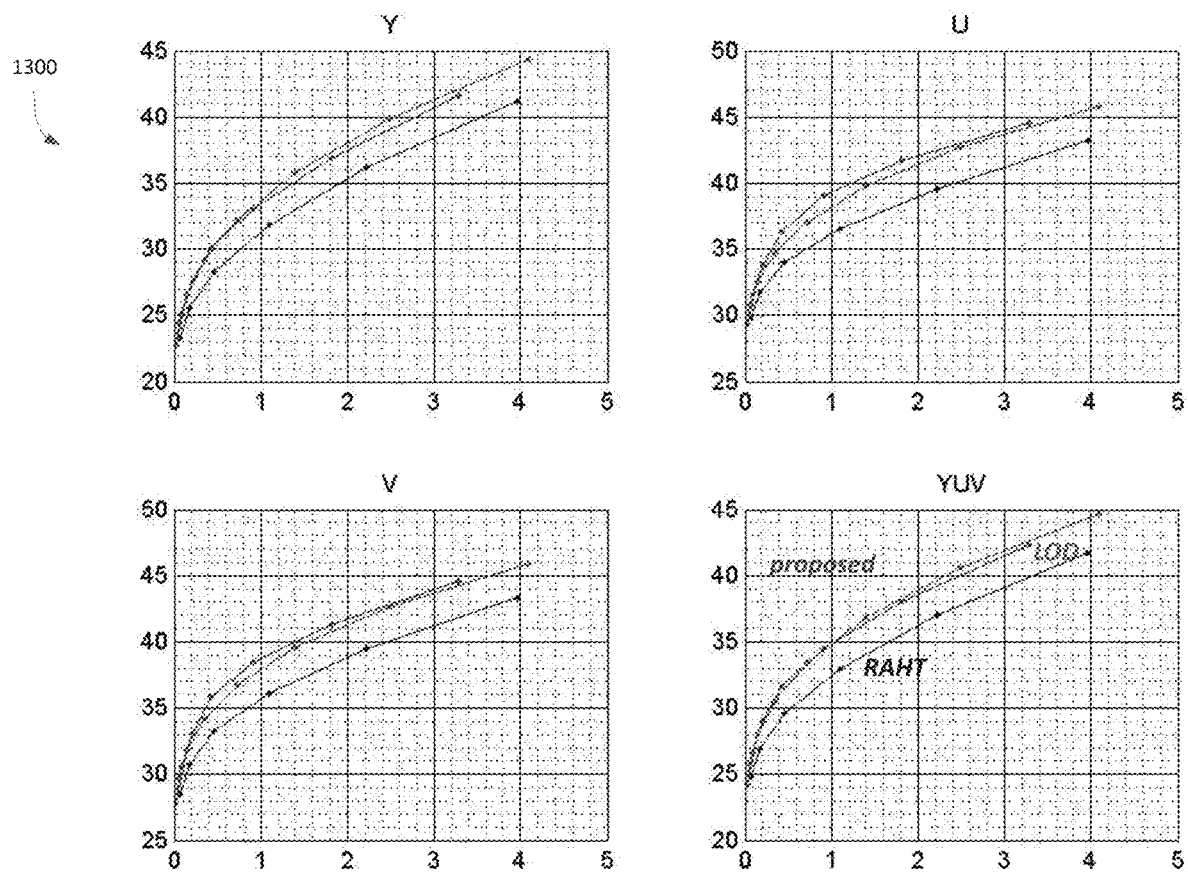
FIG. 13 shows an example graph of compression performance for one implementation in coding YUV attributes for a dense point cloud.

FIG. 13 shows an example graph 1300 of compression performance for one implementation in coding YUV attributes for a dense point cloud. The graph 1300 indicates bits-per-point on the x-axis and peak signal-to-noise ratio (PSNR) on the y-axis. The graph includes the present process, RAHT, and LoD. It will be noted that an embodiment of the present process performs at least as well or better than LoD and significantly better than RAHT on a combined YUV metric.

Figure 14:
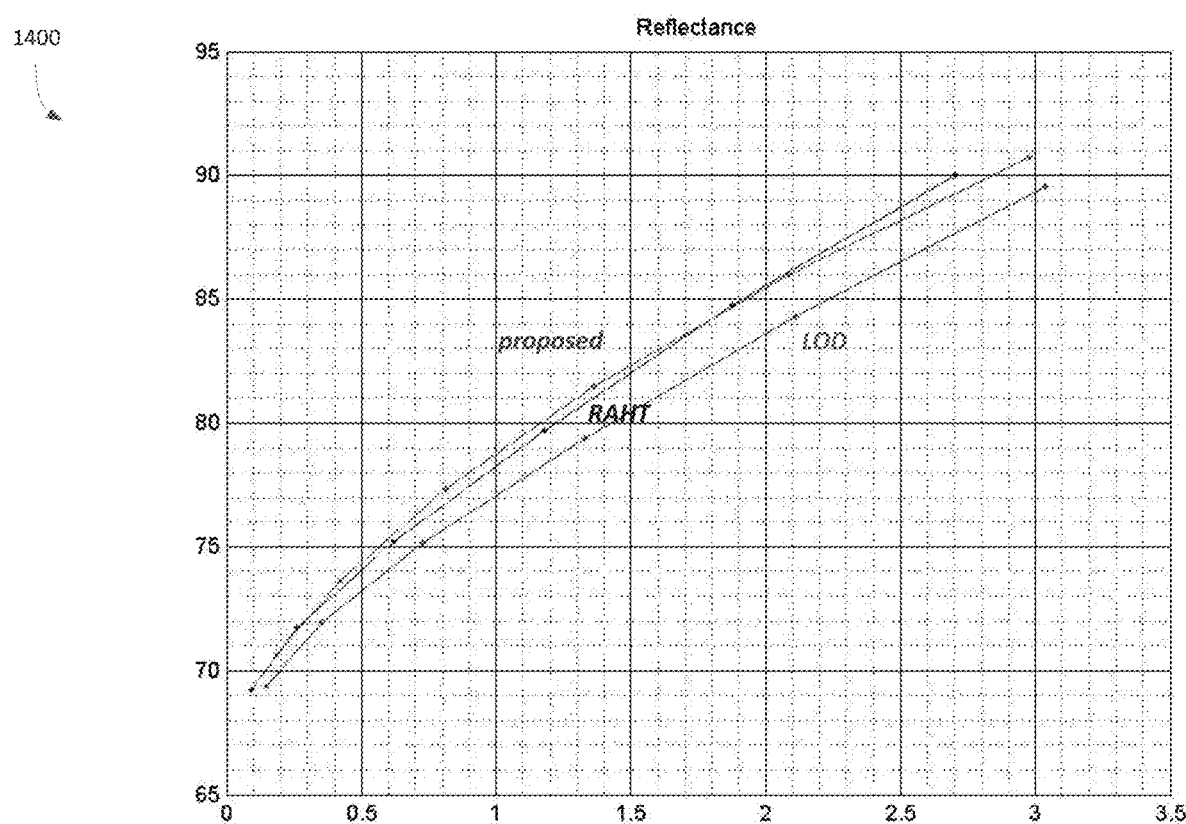
FIG. 14 shows another example graph for one implementation in coding reflectance for a sparse point cloud.

FIG. 14 shows another example graph 1400 for one implementation in coding reflectance for a sparse point cloud. The graph 1400 again shows bits-per-point on the x-axis and PSNR on the y-axis. It will be noted that an embodiment of the present process performs about as well as RAHT and much better than LoD.

Complexity Advantages of the Proposed Method Combining Transforms and Up-Sampling The complexity of the proposed method is the addition of the complexity of the transform process and the up-sampling process. In some embodiments, a very low complexity may be maintained with regard to the transform process due to the simplicity of the two-point RAHT transform and its recursive nature. The up-sampling process is spatially very local, taking into consideration neighboring nodes, typically nodes sharing a face, an edge or a vertex with a parent node for which attributes are to be up-sampled.

In comparison, the LoD approach is much more computationally demanding, in particular for sparse point clouds, because it must look for long-range attribute correlation to allow for an efficient attribute prediction. This implies a long range neighbouring point search that is computationally intensive.

In the presently described methods, the combination of transforms and up-sampling automatically profits from long-range correlation as two points far apart necessarily belong to two adjacent nodes for a low enough depth, i.e. close to the root node. At this low enough depth, transform and up-sampling ensures that the correlation between the two points is used.

Figure 15:
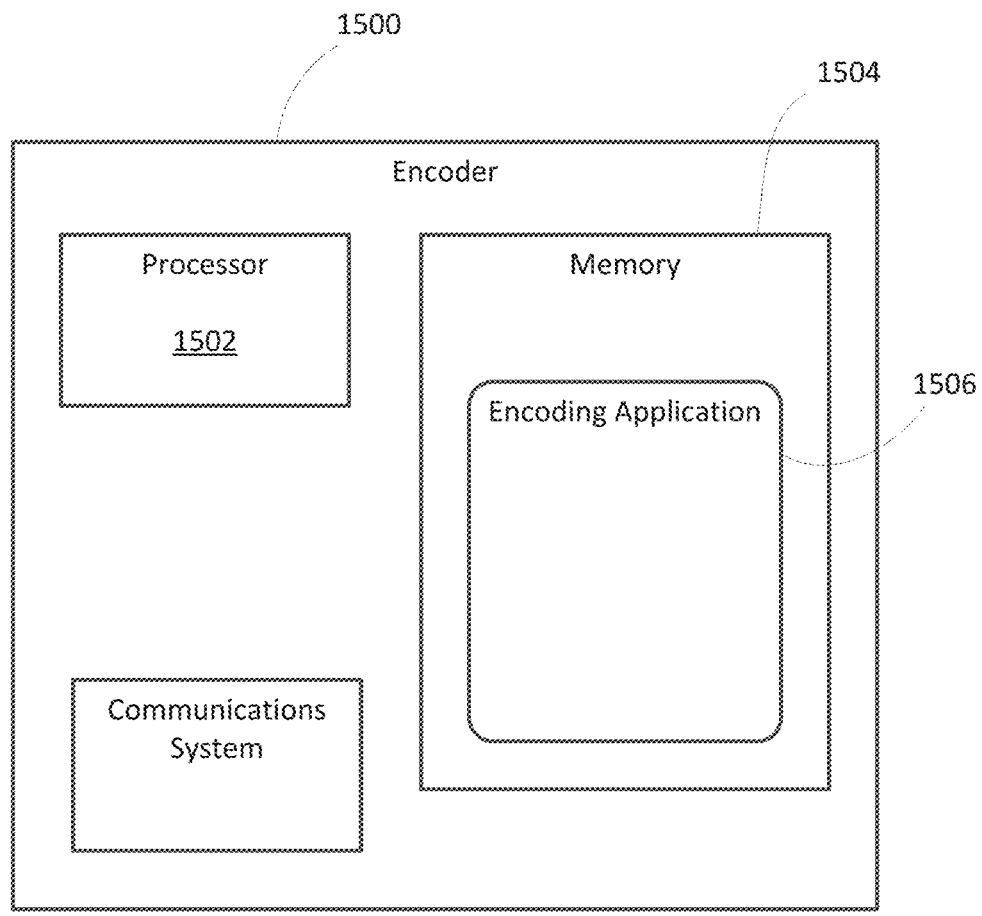
FIG. 15 shows a simplified block diagram of an example embodiment of an encoder.

Reference is now made to FIG. 15, which shows a simplified block diagram of an example embodiment of an encoder 1500. The encoder 1500 includes a processor 1502, memory 1504, and an encoding application 1506. The encoding application 1506 may include a computer program or application stored in memory 1504 and containing instructions that, when executed, cause the processor 1502 to perform operations such as those described herein. For example, the encoding application 1506 may encode and output bitstreams encoded in accordance with the processes described herein. It will be understood that the encoding application 1506 may be stored on a non-transitory computer-readable medium, such as a compact disc, flash memory device, random access memory, hard drive, etc. When the instructions are executed, the processor 1502 carries out the operations and functions specified in the instructions so as to operate as a special-purpose processor that implements the described process(es). Such a processor may be referred to as a "processor circuit" or "processor circuitry" in some examples.

Figure 16:
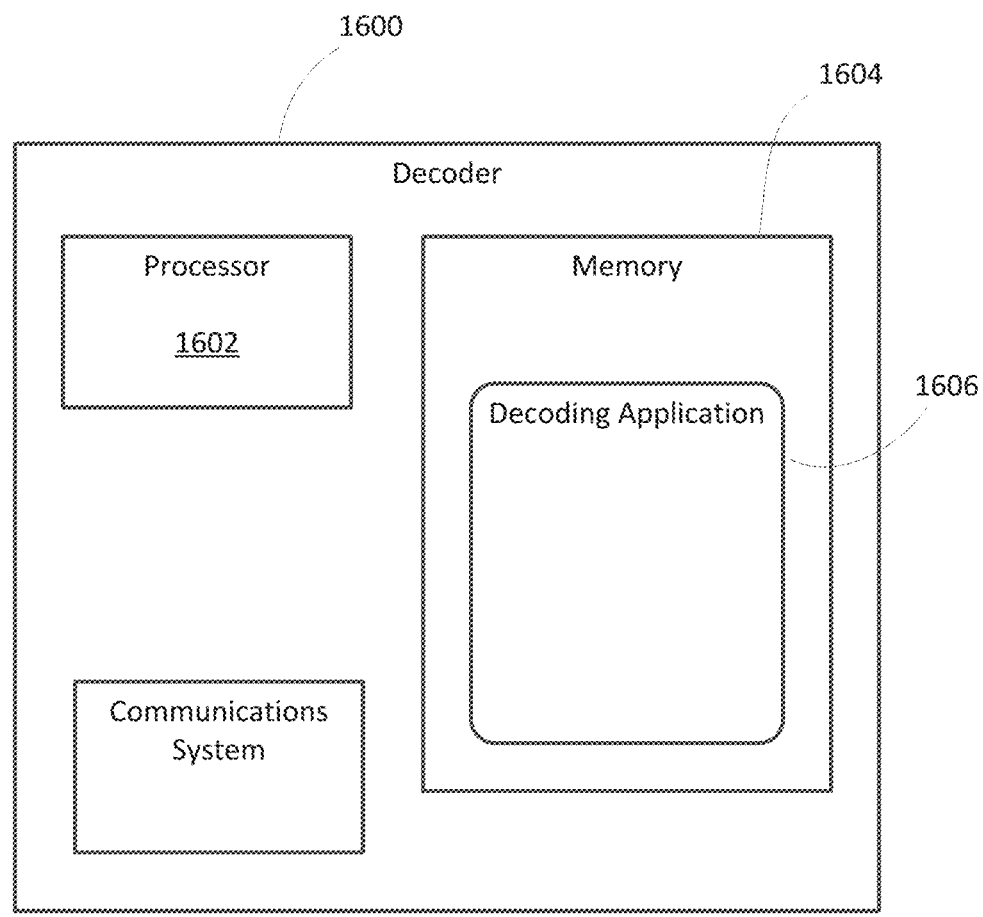
FIG. 16 shows a simplified block diagram of an example embodiment of a decoder.

Reference is now also made to FIG. 16, which shows a simplified block diagram of an example embodiment of a decoder 1600. The decoder 1600 includes a processor 1602, a memory 1604, and a decoding application 1606. The decoding application 1606 may include a computer program or application stored in memory 1604 and containing instructions that, when executed, cause the processor 1602 to perform operations such as those described herein. It will be understood that the decoding application 1606 may be stored on a computer-readable medium, such as a compact disc, flash memory device, random access memory, hard drive, etc. When the instructions are executed, the processor 1602 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive.

What is claimed is:

1. A method of encoding a point cloud to generate a bitstream of compressed point cloud data, the point cloud being located within a space recursively split and containing the points of the point cloud, each point having a respective attribute, the method comprising:
in a top-down coding process with respect to the recursively split space, for a volume containing sub-volumes that contain a plurality of points,
determining a predicted geometry-weighted sum of attributes for each occupied sub-volume of the volume based on a prediction operation based on at least a geometry-weighted sum of attributes for the volume;
applying a transform to the predicted geometry-weighted sums of attributes to produce predicted coefficients and applying the transform to corresponding original geometry-weighted sums of attributes for the occupied sub-volumes to produce original coefficients;
determining a plurality of AC coefficients from the difference between the original coefficients and the predicted coefficients, wherein residual coefficients include one DC coefficient and the plurality of AC coefficients; and
encoding the plurality of AC coefficients to output the bitstream of compressed point cloud data.

2. The method of claim 1, wherein the one DC coefficient is obtained from the geometry weighted sum of attributes for the volume.

3. The method of claim 2, further comprising determining the geometry-weighted sum of attributes for the volume by obtaining it from coding of a parent volume of which the volume is a part.

4. The method of claim 1, further comprising determining the geometry-weighted sum of attributes by summing the attributes for all points located within the volume and dividing by a square root of a count of points located within the volume.

5. The method of claim 1, wherein the prediction operation is further based on a respective geometry-weighted sum of attributes for at least one neighbouring volume that shares at least a vertex with the volume.

6. The method of claim 5, wherein the prediction operation is based on up-sampling the geometry-weighted sum of attributes of the volume and the at least one geometry-weighted sum of attributes of the neighbouring volume.

7. The method of claim 6, wherein up-sampling the geometry-weighted sum of attributes of the volume and the at least one geometry-weighted sum of attributes of the neighbouring volume includes normalizing the geometry-weighted sums of attributes by dividing by their respective square root of a count of points in the respective sums to obtain respective mean sums of attributes, up-sampling the respective mean sums of attributes to generate a predicted mean sum of attributes for each occupied sub-volume, and de-normalizing the predicted mean sum of attributes for each occupied sub-volume to obtain the predicted geometry-weighted sum of attributes for each occupied sub-volume of the volume.

8. The method of claim 1, wherein the transform conforms to a DC coefficient property whereby the DC coefficient that results from the transform of a set of geometry-weighted sums of attributes for child volumes is a geometry-weighted sum of attributes for the volume.

9. A method of decoding a bitstream of encoded point cloud attributes, the point cloud being located within a space recursively split and containing the points of the point cloud, each point having a respective attribute, the method comprising:
in a top-down coding process with respect to the recursively split space, for a volume containing sub-volumes that contain a plurality of points,
determining a predicted geometry-weighted sum of attributes for each occupied sub-volume of the volume based on a prediction operation based on at least a geometry-weighted sum of attributes for the volume;
applying a transform to the predicted geometry-weighted sums of attributes to produce predicted AC coefficients;
decoding the bitstream to reconstruct residual AC coefficients;

setting a DC coefficient to the geometry-weighted sum of attributes for the volume;

adding the residual AC coefficients and the DC coefficient to the predicted AC coefficients to produce reconstructed coefficients; and inverse transforming the reconstructed coefficients to produce reconstructed geometry-weighted sums of attributes for the occupied sub-volumes, whereby at a maximum depth the reconstructed geometry-weighted sums of attributes for the occupied sub-volumes are reconstructed attributes.

10. The method of claim 9, further comprising determining the geometry-weighted sum of attributes for the volume by obtaining it from decoding of a parent volume of which the volume is a part.

11. The method of claim 9, wherein the geometry-weighted sum of attributes for the volume is based on a sum of the attributes for all points located within the volume divided by a square root of a count of points located within the volume.

12. The method of claim 9, wherein the prediction operation is further based on a respective geometry-weighted sum of attributes for at least one neighbouring volume that shares at least a vertex with the volume.

13. The method of claim 12, wherein the prediction operation is based on up-sampling the geometry-weighted sum of attributes of the volume and the at least one geometry-weighted sum of attributes of the neighbouring volume.

14. The method of claim 13, wherein up-sampling the geometry-weighted sum of attributes of the volume and the at least one geometry-weighted sum of attributes of the neighbouring volume includes normalizing the geometry-weighted sums of attributes by dividing by their respective square root of a count of points in the respective sums to obtain respective mean sums of attributes, up-sampling the respective mean sums of attributes to generate a predicted mean sum of attributes for each occupied sub-volume, and de-normalizing the predicted mean sum of attributes for each occupied sub-volume to obtain the predicted geometry-weighted sum of attributes for each occupied sub-volume of the volume.

15. The method of claim 9, wherein the transform conforms to a DC coefficient property whereby the DC coefficient that results from the transform of a set of geometry-weighted sums of attributes for child volumes is a geometry-weighted sum of attributes for the volume.

16. An encoder to encode a point cloud to generate a bitstream of compressed point cloud data, the point cloud being located within a space recursively split and containing the points of the point cloud, each point having a respective attribute, the encoder comprising:

memory;

at least one processor;

an encoding application stored in the memory and containing processor-executable instructions that, when executed by the at least one processor, cause the at least one processor to:

in a top-down coding process with respect to the recursively split space, for a volume containing sub-volumes that contain a plurality of points, determine a predicted geometry-weighted sum of attributes for each occupied sub-volume of the volume based on a prediction operation based on at least a geometry-weighted sum of attributes for the volume;

apply a transform to the predicted geometry-weighted sums of attributes to produce predicted coefficients and apply the transform to corresponding original geometry-weighted sums of attributes for the occupied sub-volumes to produce original coefficients;

determine a plurality of AC coefficients from the difference between the original coefficients and the predicted coefficients, wherein residual coefficients include one DC coefficient and the plurality of AC coefficients; and encode the plurality of AC coefficients to output the bitstream of compressed point cloud data.

17. The encoder of claim 16, wherein the one DC coefficient is obtained from the geometry weighted sum of attributes for the volume.

18. The encoder of claim 17, wherein the processor-executable instructions, when executed, further cause the at least one processor to determine the geometry-weighted sum of attributes for the volume by obtaining it from coding of a parent volume of which the volume is a part.

19. The encoder of claim 16, wherein the processor-executable instructions, when executed, further cause the at least one processor to determine the geometry-weighted sum of attributes by summing the attributes for all points located within the volume and dividing by a square root of a count of points located within the volume.

20. The encoder of claim 16, wherein the prediction operation is further based on a respective geometry-weighted sum of attributes for at least one neighbouring volume that shares at least a vertex with the volume.

21. The encoder of claim 20, wherein the prediction operation is based on up-sampling the geometry-weighted sum of attributes of the volume and the at least one geometry-weighted sum of attributes of the neighbouring volume.

22. The encoder of claim 21, wherein up-sampling the geometry-weighted sum of attributes of the volume and the at least one geometry-weighted sum of attributes of the neighbouring volume includes normalizing the geometry-weighted sums of attributes by dividing by their respective square root of a count of points in the respective sums to obtain respective mean sums of attributes, up-sampling the respective mean sums of attributes to generate a predicted mean sum of attributes for each occupied sub-volume, and de-normalizing the predicted mean sum of attributes for each occupied sub-volume to obtain the predicted geometry-weighted sum of attributes for each occupied sub-volume of the volume.

23. The encoder of claim 16, wherein the transform conforms to a DC coefficient property whereby the DC coefficient that results from the transform of a set of geometry-weighted sums of attributes for child volumes is a geometry-weighted sum of attributes for the volume.

24. A decoder to decode a bitstream of encoded point cloud attributes, the point cloud being located within a space recursively split and containing the points of the point cloud, each point having a respective attribute, the decoder comprising:

memory;

at least one processor;

an encoding application stored in the memory and containing processor-executable instructions that, when executed by the at least one processor, cause the at least one processor to:

in a top-down coding process with respect to the recursively split space, for a volume containing sub-volumes that contain a plurality of points, determine a predicted geometry-weighted sum of attributes for each occupied sub-volume of the volume based on a prediction operation based on at least a geometry-weighted sum of attributes for the volume;

apply a transform to the predicted geometry-weighted sums of attributes to produce predicted AC coefficients;

decode the bitstream to reconstruct residual AC coefficients;

set a DC coefficient to the geometry-weighted sum of attributes for the volume;

add the residual AC coefficients and the DC coefficient to the predicted AC coefficients to produce reconstructed coefficients; and inverse transform the reconstructed coefficients to produce reconstructed geometry-weighted sums of attributes for the occupied sub-volumes, whereby at a maximum depth the reconstructed geometry-weighted sums of attributes for the occupied sub-volumes are reconstructed attributes.

25. The decoder of claim 24, wherein the processor-executable instructions, when executed, further cause the at least one processor to determine the geometry-weighted sum of attributes for the volume by obtaining it from decoding of a parent volume of which the volume is a part.

26. The decoder of claim 24, wherein the geometry-weighted sum of attributes for the volume is based on a sum of the attributes for all points located within the volume divided by a square root of a count of points located within the volume.

27. The decoder of claim 24, wherein the prediction operation is further based on a respective geometry-weighted sum of attributes for at least one neighbouring volume that shares at least a vertex with the volume.

28. The decoder of claim 27, wherein the prediction operation is based on up-sampling the geometry-weighted sum of attributes of the volume and the at least one geometry-weighted sum of attributes of the neighbouring volume.

29. The decoder of claim 28, wherein up-sampling the geometry-weighted sum of attributes of the volume and the at least one geometry-weighted sum of attributes of the neighbouring volume includes normalizing the geometry-weighted sums of attributes by dividing by their respective square root of a count of points in the respective sums to obtain respective mean sums of attributes, up-sampling the respective mean sums of attributes to generate a predicted mean sum of attributes for each occupied sub-volume, and de-normalizing the predicted mean sum of attributes for each occupied sub-volume to obtain the predicted geometry-weighted sum of attributes for each occupied sub-volume of the volume.

30. The decoder of claim 24, wherein the transform conforms to a DC coefficient property whereby the DC coefficient that results from the transform of a set of geometry-weighted sums of attributes for child volumes is a geometry-weighted sum of attributes for the volume.

* * * * *